US010096186B2

(12) United States Patent
Geerlings et al.

(10) Patent No.: US 10,096,186 B2
(45) Date of Patent: *Oct. 9, 2018

(54) TRAINABLE TRANSCEIVER AND CLOUD COMPUTING SYSTEM ARCHITECTURE SYSTEMS AND METHODS

(71) Applicant: Gentex Corporation, Zeeland, MI (US)

(72) Inventors: Steven L. Geerlings, Holland, MI (US); Todd R. Witkowski, Zeeland, MI (US); Thomas S. Wright, Holland, MI (US); Douglas C. Papay, Zeeland, MI (US); Carl L. Shearer, Hudsonville, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/631,405

(22) Filed: Jun. 23, 2017

(65) Prior Publication Data

US 2017/0294065 A1 Oct. 12, 2017

Related U.S. Application Data

(63) Continuation of application No. 14/688,911, filed on Apr. 16, 2015, now Pat. No. 9,691,271.

(Continued)

(51) Int. Cl.
*G05B 19/00* (2006.01)
*G07C 9/00* (2006.01)

(52) U.S. Cl.
CPC .................... *G07C 9/00309* (2013.01); *G07C 2009/00793* (2013.01); *G07C 2009/00865* (2013.01);

(Continued)

(58) Field of Classification Search
CPC ...................................................... G08C 17/02

(Continued)

(56) References Cited

U.S. PATENT DOCUMENTS

| | | | | |
|---|---|---|---|---|
| 5,614,891 | A | 3/1997 | Zeinstra et al. | |
| 7,158,871 | B1 * | 1/2007 | Ilan | G01C 21/3608 701/36 |

(Continued)

FOREIGN PATENT DOCUMENTS

| | | |
|---|---|---|
| DE | 10 2010 015 104 A1 | 10/2011 |
| WO | WO-2008/082482 A2 | 7/2008 |

OTHER PUBLICATIONS

International Preliminary Report on Patentability and Transmittal in corresponding International Application No. PCT/U82015/026244, dated Dec. 22, 2016, 9 pages.

(Continued)

*Primary Examiner* — Santiago Garcia
(74) *Attorney, Agent, or Firm* — Foley & Lardner LLP; Bradley D. Johnson

(57) ABSTRACT

A system for installation in a vehicle and for controlling a device, the system including a trainable transceiver, communications electronics, and a processing circuit coupled to the trainable transceiver and the communications electronics. The processing circuit is configured to train the trainable transceiver to control a device using information received from a cloud computing system remote from the device and vehicle via the communications electronics.

20 Claims, 18 Drawing Sheets

Related U.S. Application Data

(60) Provisional application No. 61/981,516, filed on Apr. 18, 2014.

(52) U.S. Cl.
CPC .............. *G07C 2009/00888* (2013.01); *G07C 2009/00928* (2013.01)

(58) Field of Classification Search
USPC .......................................................... 340/5.25
See application file for complete search history.

(56) References Cited

U.S. PATENT DOCUMENTS

| | | | | |
|---|---|---|---|---|
| 7,183,940 | B2 * | 2/2007 | Chuey | G08C 17/02 340/12.23 |
| 9,229,905 | B1 * | 1/2016 | Penilla | G06F 17/00 |
| 2003/0118187 | A1 | 6/2003 | Fitzgibbon | |
| 2003/0141987 | A1 | 7/2003 | Hayes | |
| 2003/0149991 | A1 | 8/2003 | Reidhead et al. | |
| 2006/0085115 | A1 * | 4/2006 | Ilan | B60R 16/0373 701/49 |
| 2006/0232377 | A1 | 10/2006 | Witkowski | |
| 2008/0291047 | A1 | 11/2008 | Summerford et al. | |
| 2010/0029261 | A1 | 2/2010 | Mikkelsen et al. | |
| 2010/0063670 | A1 * | 3/2010 | Brzezinski | H04L 67/1095 701/31.4 |
| 2010/0159846 | A1 * | 6/2010 | Witkowski | G07C 9/00857 455/70 |
| 2011/0037574 | A1 | 2/2011 | Pratt et al. | |
| 2011/0218965 | A1 | 9/2011 | Lee et al. | |
| 2011/0225451 | A1 | 9/2011 | Leggette et al. | |
| 2011/0227698 | A1 | 9/2011 | Witkowski et al. | |
| 2011/0267282 | A1 * | 11/2011 | Chao | H04L 67/1097 345/173 |
| 2011/0287757 | A1 | 11/2011 | Nykoluk et al. | |
| 2012/0072910 | A1 * | 3/2012 | Martin | G06F 9/45533 718/1 |
| 2012/0133841 | A1 | 5/2012 | Vanderhoff et al. | |
| 2012/0191770 | A1 | 7/2012 | Perlmutter et al. | |
| 2012/0254960 | A1 * | 10/2012 | Lortz | H04L 63/104 726/7 |
| 2013/0063243 | A1 * | 3/2013 | Witkowski | G07C 9/00857 340/5.7 |
| 2013/0304863 | A1 * | 11/2013 | Reber | G06F 1/3203 709/218 |
| 2013/0345958 | A1 * | 12/2013 | Paek | G01C 21/3679 701/400 |
| 2014/0245284 | A1 * | 8/2014 | Alrabady | G06F 8/65 717/173 |
| 2014/0327690 | A1 * | 11/2014 | McGuire | A63F 13/355 345/589 |
| 2015/0091708 | A1 * | 4/2015 | Tan | G08C 17/02 340/12.5 |
| 2015/0113568 | A1 * | 4/2015 | Lee | H04N 21/234336 725/47 |
| 2015/0142573 | A1 * | 5/2015 | Chien | H04N 1/00153 705/14.58 |
| 2015/0161832 | A1 | 6/2015 | Esselink et al. | |
| 2015/0185030 | A1 * | 7/2015 | Monroe | G01C 21/3438 701/532 |
| 2015/0210287 | A1 * | 7/2015 | Penilla | B60W 40/08 701/49 |
| 2015/0310737 | A1 * | 10/2015 | Simanowski | G08G 1/081 340/910 |
| 2015/0310765 | A1 * | 10/2015 | Wright | G09B 19/167 434/66 |
| 2015/0319569 | A1 * | 11/2015 | Chen | H04W 4/028 455/456.1 |
| 2016/0009188 | A1 * | 1/2016 | Yokoyama | B60L 1/003 701/22 |
| 2016/0039285 | A1 * | 2/2016 | Mathieu | B60K 35/00 340/576 |
| 2016/0104486 | A1 * | 4/2016 | Penilla | H04L 67/12 704/232 |

OTHER PUBLICATIONS

International Search Report and Written Opinion of the International Searching Authority in corresponding International Application No. PCT/US2015/026244, dated Dec. 8, 2016, 11 pages.
International Search Report and Written Opinion of the International Searching Authority in PCT/US2015/015262 dated Jul. 2, 2015, 10 pages.
U.S. Notice of Allowance on U.S. Appl. No. 14/688,911 dated Feb. 24, 2017.
U.S. Notice of Allowance on U.S. Appl. No. 14/688,925 dated Feb. 6, 2017.
U.S. Office Action on U.S. Appl. No. 14/688,911 dated May 27, 2016.
U.S. Office Action on U.S. Appl. No. 14/688,911 dated Oct. 12, 2016.
U.S. Office Action on U.S. Appl. No. 14/688,925 dated Apr. 22, 2016.
U.S. Office Action on U.S. Appl. No. 14/688,925 dated Oct. 12, 2016.
U.S. Office Action on U.S. Appl. No. 14/688,969 dated Oct. 20, 2016.
U.S. Office Action on U.S. Appl. No. 14/688,969 dated Jun. 1, 2017.
U.S. Office Action on U.S. Appl. No. 14/688,969 dated Dec. 6, 2017.

* cited by examiner

TRAINABLE TRANSCEIVER AND CLOUD COMPUTING SYSTEM ARCHITECTURE SYSTEMS AND METHODS

CROSS-REFERENCE TO RELATED APPLICATIONS

This application claims benefit and priority under 35 U.S.C. § 120 to U.S. patent application Ser. No. 14/688,911, titled "TRAINABLE TRANSCEIVER AND CLOUD COMPUTING SYSTEM ARCHITECTURE SYSTEMS AND METHODS," filed Apr. 16, 2015, which claims the benefit of U.S. Provisional Application No. 61/981,516, titled "TRAINABLE TRANSCEIVER AND CLOUD COMPUTING SYSTEM ARCHITECTURE SYSTEMS AND METHODS," filed Apr. 18, 2014, each of which is hereby incorporated by reference in its entirety.

BACKGROUND OF THE INVENTION

The present invention relates generally to the field of trainable transceivers for inclusion within a vehicle. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. A trainable transceiver may be incorporated in a vehicle (integrally or contained within the vehicle) and used to control devices outside the vehicle. It is challenging and difficult to develop trainable transceivers which are easy to train to operate a variety of devices. It is further challenging and difficult to develop a trainable transceiver which interfaces with devices other than those being controlled (e.g., vehicle systems and/or systems located remote to the vehicle) for use in training or for performing additional useful functions. It is further challenging and difficult to develop a trainable transceiver which may access information from a remote source for use in training the trainable transceiver to control a device.

SUMMARY OF THE INVENTION

One embodiment relates to a system for installation in a vehicle and for controlling a device, the system including a trainable transceiver, communications electronics, and a processing circuit coupled to the trainable transceiver and the communications electronics. The processing circuit is configured to train the trainable transceiver to control a device using information received from a cloud computing system remote from the device and vehicle via the communications electronics.

Another embodiment relates to a method for training a trainable transceiver. The method includes receiving, at a processing circuit, a user input. The method further includes sending a request transmission to a cloud computing system using communications electronics coupled to the processing circuit. In response to the request transmission, the method includes receiving training information, using the communication electronics, from the cloud computing system, wherein the training information includes an activation signal parameter. The method further includes storing an activation signal parameter received from the cloud computing system in memory coupled to the processing circuit.

Another embodiment relates to a system for installation in a vehicle and for controlling a remote device. The system includes a trainable transceiver, an input device, communications electronics, and a processing circuit coupled to the trainable transceiver, the input device, and the communications electronics. The processing circuit is configured to receive a user identification via the input device, and is configured to send, using the communications electronics, a transmission to a cloud computing system containing the user identification. The processing circuit is further configured to train the trainable transceiver to control a remote device using information received from a cloud computing system via the communications electronics.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
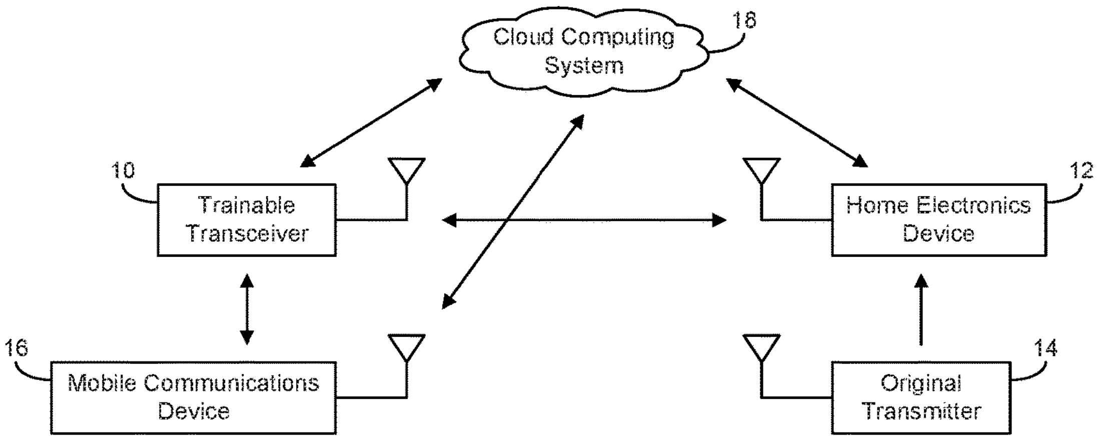
FIG. 1 illustrates an exemplary embodiment of communication among devices including a trainable transceiver, mobile communications device, home electronics device, original transmitter, and cloud computing system.

Generally, a trainable transceiver controls one or more home electronic devices and/or remote devices. For example, the trainable transceiver may be a Homelink™ trainable transceiver. Home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver user to send activation signals and/or other information to home electronic devices and/or remote devices. The same wireless transmission scheme, protocol, and/or hardware may be used from transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device and/or remote device (e.g., sending activation signals to the device). The trainable transceiver may receive information about the home electronic device and/or remote device using additional hardware. The information about the home electronic device and/or remote device may be received from an intermediary device such as an additional remote device and/or mobile communication device.

A trainable transceiver may also receive information from and/or transmit information to other devices configured to communicate with the trainable transceiver. For example, a trainable transceiver may receive information for cameras (e.g., imaging information may be received) and/or other sensors. The cameras and/or other sensors may communicate with a trainable transceiver wirelessly (e.g., using one or more transceivers) or through a wired connection.

In some embodiments, a trainable transceiver may communicate with mobile communications devices (e.g., cell phones, tablets, smartphones, or other communication devices). In some embodiments, mobile communications devices may include other mobile electronics devices such as laptops, personal computers, and/or other devices. In still further embodiments, the trainable transceiver is configured to communicate with networking equipment such as routers, servers, cellular towers, switches, and/or other hardware for enabling network communication. The network may be the internet, an intranet, and/or a cloud computing system architecture.

In some embodiments, the trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz) although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or other communication device.

A trainable transceiver may be configured (e.g., trained) to send activation signals and/or other information to a particular device and/or receive control signals and/or information from a particular device. The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and determine control information from the received signal. Training information (e.g., activation signal frequency, device identification information, encryption information, modulation scheme used by the device, or other information related to controlling a device via an activation signal) may also be received by a trainable transceiver from a remote device, mobile communications device, or other source.

A trainable transceiver may be mounted or otherwise attached to a vehicle in a variety of locations. For example, a trainable transceiver may be integrated into a dashboard or center stack (e.g., infotainment center) of a vehicle. The trainable transceiver may be integrated into the vehicle by a vehicle manufacturer. A trainable transceiver may be located in other peripheral locations. For example, a trainable transceiver may be removably mounted to a visor. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror of the vehicle. A vehicle manufacturer may include a trainable transceiver in the rear view mirror.

In other embodiments, a vehicle may be retrofit to include a trainable transceiver. This may include attaching a trainable transceiver to a vehicle surface using a clip, adhesive, or other mounting hardware as described above. Alternatively, it may include replacing a vehicle component with one that includes an integrated trainable transceiver and/or installing a vehicle component which includes an integrated trainable transceiver. For example, an aftermarket rear view mirror, vehicle camera system (e.g., one or more cameras and one or more display screens), and/or infotainment center may include an integrated trainable transceiver. In further embodiments, one or more components of a trainable transceiver may be distributed within the vehicle.

Referring now to FIG. 1, a trainable transceiver 10 may communicate with a home electronics device 12. In some embodiments, the trainable transceiver 10 and home electronics device 12 communicate using two way communications. For example, the trainable transceiver 10 may transmit activation signals, control signals, requests for information, data and/or other information to the home electronics device 12. The home electronics device 12 may transmit status information, responses to requests for information, data, requests for information, and/or other information to the trainable transceiver 10. The same and/or similar two way communication may be made between the trainable transceiver 10 and a remote device. In other embodiments, there is only one way communication between the trainable transceiver 10 and the home electronics device 12 and/or remote device. For example, the trainable transceiver 10 transmits activation signals, control signals, data, and/or other information to the home electronics device 12 and/or remote device, and the trainable transceiver 10 does not receive transmissions from the home electronics device 12 or remote device.

In some embodiments, an original transmitter 14 may communicate with the home electronics device 12 and/or remote device. In one embodiment, the original transmitter 14 communicates with the home electronics device 12 and/or remote device using one way communication. For example, the original transmitter 14 may transmit an activation signal to the home electronics device 12 and/or remote device. In some embodiments, the original transmitter 14 may be the source of an activation signal, activation signal parameters, and/or other information related to controlling a home electronics device 12 and/or remote device. This information may be received by a mobile communications device 16 as discussed in greater detail herein. In alternative embodiments, the original transmitter 14 is capable of two way communication. In some embodiments, the trainable transceiver 10 may be configured to receive an activation signal and/or other information from the original transmitter 14.

In one embodiment, the trainable transceiver 10 is capable of two way communication with the mobile communications device 16. For example, a smartphone may be paired with a trainable transceiver such that the trainable transceiver and smartphone communicate using wireless transceivers (e.g., using radio frequency transceivers and/or a protocol such as Bluetooth communication). The trainable transceiver 10 and the mobile communications device 16 may exchange information such as status, notifications, activation signals, training information, activation signal parameters, device identification information (e.g., the serial number, make, and/or model of a home electronics device), and/or other information.

In some embodiments, information such as activation signal parameters, training information, status information, notifications, diagnostic information, and/or other information may be stored in a cloud computing system 18 based architecture (e.g., highly available server computers available via Internet). The cloud computing system 18 resources may be in unidirectional or bi-directional communication with one or more trainable transceivers, mobile communications devices, home electronics devices, remote devices, and/or other devices. Communication between the cloud computing system 18 and other devices may allow for the transmission of information stored on the cloud computing system 18 to the device and/or the transmission of information stored on the device to the cloud computing system 18.

In some embodiments, the communication described herein with respect to FIG. 1 is wireless communication. In other embodiments, communication may be wired communication. For example, communication between two or more devices may use a wireless network, wireless transceiver, and/or wireless communication protocol (e.g., WiFi, Zigbee, Bluetooth, cellular, etc.), a wired interface and/or protocol (e.g., Ethernet, universal serial bus (USB), Firewire, etc.), or other communications connection (e.g. infrared, optical, ultrasound, etc.). In some embodiments, free-space optical communication techniques and/or techniques in which data is encoded onto light emitted by a light source through modulation of the light source (e.g., frequency modulation, amplitude modulation, etc.) may be used for wireless communications between one or more of the devices illustrated in FIG. 1. For example, the devices may include light sources such as light emitting diodes and light sensors (e.g., a camera, photodector) used to generate light based signals and to receive light based signals. This and/or other hardware (e.g., control circuit) or software may allow two or more devices to communicate using light. In other embodiments, two or more of the devices illustrated in FIG. 1 communicate using sound based communication. For example, a modulated sound wave technique, a technique based on the frequency, wavelength, amplitude, Decibel, and/or other parameters of the sound wave(s), protocol (e.g., fax protocol), and/or other techniques may be used to communicate using sound waves. The sound waves may be in the ultrasound frequency spectrum, acoustic (e.g., audible) spectrum, infrasound spectrum, and/or other spectrum. The devices may include hardware and/or software used in communicating with sound such as control circuits, speakers, microphones, and/or other hardware and/or software used to facilitate sound based communication. In further embodiments, other types of communication may be used. For example, two devices may communicate by exchanging machine readable images containing encoded information (e.g., a display of a first device displays a machine readable image read by a camera of a second device an decoded using a control circuit), by exchanging text messages, by exchanging e-mails, and/or using other types of communication.

Figure 2A:
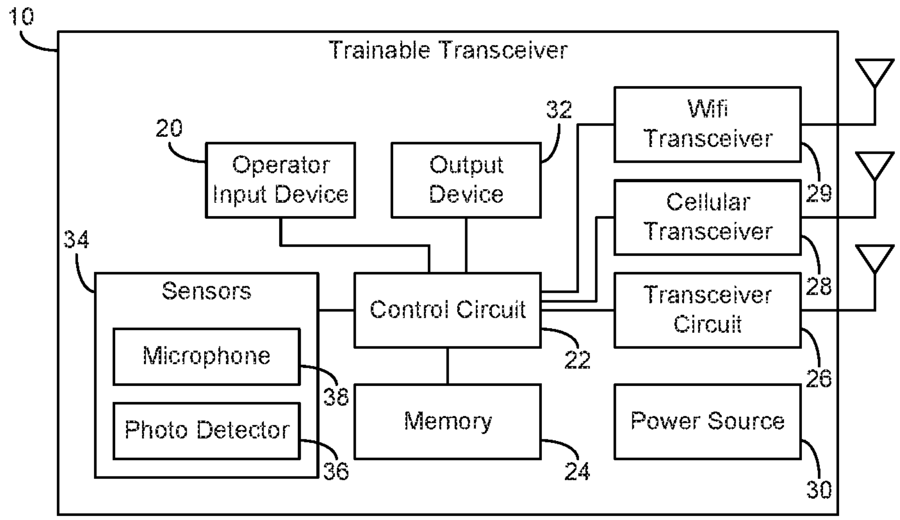
FIG. 2A illustrates an exemplary embodiment of components included in a trainable transceiver.

Referring now to FIG. 2A, an exemplary embodiment of a trainable transceiver is illustrated. In one embodiment, the trainable transceiver 10 includes an operator input device 20. The operator input device 20 may be one or more buttons. For example, the operator input device 20 may be three hard key buttons. In some embodiments, the operator input device 20 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action. In additional embodiments, the operator input device 20 may display data to a user or otherwise provide outputs in addition to receiving user input. For example, the operator input device 20 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output. In some embodiments, the operator input device 20 is connected to a control circuit 22. The control circuit 22 may send information and or control signals or instructions to the operator input device 20. For example, the control circuit 22 may send output instructions to the operator input device 20 causing the display of an image. The control circuit 22 may also receive input signals, instructions, and/or data from the operator input device 20.

The control circuit 22 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 22 may be a SoC individually or with additional hardware components described herein. The control circuit 22 may further include, in some embodiments, memory (e.g., random access memory, read only memory, flash memory, hard disk storage, flash memory storage, solid state drive memory, etc.). In further embodiments, the control circuit 22 may function as a controller for one or more hardware components included in the trainable transceiver 10. For example, the control circuit 22 may function as a controller for a touchscreen display or other operator input device, a controller for a transceiver, transmitter, receiver, or other communication device (e.g., implement a Bluetooth communications protocol).

In some embodiments, the control circuit 22 receives inputs from operator input devices 20 and processes the inputs. The inputs may be converted into control signals, data, inputs to be sent to the base station, etc. The control circuit 22 may control the transceiver circuit 26 and use the transceiver circuit 26 to communicate (e.g., receive signals and/or transmit signals) with one or more of original transmitters, home electronic devices, mobile communication devices, and/or remote devices. The control circuit 22 may also be used to in the training process.

The control circuit 22 is coupled to memory 24. The memory 24 may be used to facilitate the functions of the trainable transceiver described herein. Memory 24 may be volatile and/or non-volatile memory. For example, memory 24 may be random access memory, read only memory, flash memory, hard disk storage, flash memory storage, solid state drive memory, etc. In some embodiments, the control circuit 22 reads and writes to memory 24. Memory 24 may include computer code modules, data, computer instructions, or other information which may be executed by the control circuit 22 or otherwise facilitate the functions of the trainable transceiver 10 described herein. For example, memory 24 may include encryption codes, pairing information, identification information, a device registry, etc. Memory 24 and/or the control circuit 22 may facilitate the functions described herein using one or more programming techniques, data manipulation techniques, and/or processing techniques such as using algorithms, routines, lookup tables, arrays, searching, databases, comparisons, instructions, etc.

The trainable transceiver 10 may further include a transceiver circuit 26 coupled to the control circuit 22. The transceiver circuit 26 allows the trainable transceiver 10 to transmit and/or receive wireless communication signals. The wireless communication signals may be transmitted to or received from a variety of wireless devices (e.g., an original transmitter, home electronic device, mobile communications device, and/or remote device). The transceiver circuit 26 may be controlled by the control circuit 22. For example, the control circuit 22 may turn on or off the transceiver circuit 26, the control circuit 22 may send data using the transceiver circuit 26, format information, an activation signal, control signal, and/or other signal or data for transmission via the transceiver circuit 26, or otherwise control the transceiver circuit 26. Inputs from the transceiver circuit 26 may also be received by the control circuit 22. In some embodiments, the transceiver circuit 26 may include additional hardware such as processors, memory, integrated circuits, antennas, etc. The transceiver circuit 26 may process information prior to transmission or upon reception and prior to passing the information to the control circuit 22. In some embodiments, the transceiver circuit 26 may be coupled directly to memory 24 (e.g., to store encryption data, retrieve encryption data, etc.). In further embodiments, the transceiver circuit 26 may include one or more transceivers, transmitters, receivers, etc. For example, the transceiver circuit 26 may include an optical transceiver, near field communication (NFC) transceiver, etc. In some embodiments, the transceiver circuit 26 may be implemented as a SoC.

In further embodiments, the control circuit 22 is coupled to additional transceiver circuits, receivers, and/or transmitters. In one embodiment, the additional transceiver circuit is used for communicating with (transmitting to and/or receiving from) home electronic devices and/or remote devices. In some embodiments, the additional transceiver circuit may be or include a cellular transceiver 28. The trainable transceiver 10 may use the transceiver circuit 26 and/or an additional transceiver (e.g., a cellular transceiver 28) to access the internet, other networks, and/or network hardware. In other embodiments, the trainable transceiver 10 may access the internet, other networks, and/or network hardware through an intermediate device in communication with the trainable transceiver 10 such as a mobile communications device.

Additional transceivers may be used to communicate with other devices (e.g., mobile communications devices, cameras, network devices, a cloud computing system, or other wireless devices). The transceiver circuit 26 and other transceivers may operate using different frequency, transmission spectrums, protocols, and/or otherwise transmit and/or receive signals using different techniques. For example, the transceiver circuit 26 may be configured to send activation signals to a home electronic device (e.g., a garage door opener) using an encrypted radio wave transmission and an additional transceiver may communicate with a remote communications device (e.g., a smartphone) using a Bluetooth transceiver (e.g., a Bluetooth low energy (BLE) transceiver) and Bluetooth communications protocol (e.g., BLE protocol). In some embodiments, the trainable transceiver 10 includes a WiFi transceiver 29. The WiFi transceiver 29 may be configured to allow communication between the trainable transceiver 10 and a other hardware (e.g., a wireless router) using a wireless network. The WiFi transceiver 29 may communicate according to a WiFi protocol such as IEEE 802.11. The WiFi transceiver 29 may allow the trainable transceiver 10 to access the internet through additional hardware such as a wireless router with access to the internet.

The trainable transceiver 10 may communicate with original transmitters 14, home electronic devices 12, remote devices, mobile communications devices 16, network devices, and/or other devices as described above using the transceiver circuit 26 and/or other additional transceiver circuits or hardware. The devices with which the trainable transceiver communicates may include transceivers, transmitters, and/or receivers. The communication may be one-way or two-way communication.

With continued reference to FIG. 2A, the trainable transceiver 10 may include a power source 30. The power source 30 provides electrical power to the components of the trainable transceiver 10. In one embodiment, the power source 30 is self-contained. For example, the power source 30 may be a battery, solar cell, or other power source not requiring a wired connection to another source of electrical power. In other embodiments, the power source 30 may be a wired connection to another power source. For example, the power source 30 may be a wired connection to a vehicle power supply system. The power source 30 may be integrated into the vehicle electrical system. This may allow the trainable transceiver 10 to draw electrical power from a vehicle battery, be turned on or off by a vehicle electrical system (e.g., turned off when the vehicle is turned off, turned on when a vehicle door is opened, etc.), draw power provided by a vehicle alternator, or otherwise be integrated with the electrical power systems(s) of the vehicle.

In some embodiments, the trainable transceiver 10 includes one or more output devices 32. In some embodiments, the output devices 32 are controlled by the control circuit 22, provide input to the control circuit 22, communicate output from the control circuit 22 to a user or other device, and/or are otherwise in communication with the control circuit 22. Output devices 32 may include a display. The display allows for visual communication with a user. The display may be configured to output a visual representation based on computer instructions, control signals, computer code, frame buffers, and/or other electronic signals or information. In some embodiments, the display includes a graphics processing unit (GPU), controller, and/or other hardware to facilitate the handling of and display of graphics information. In other embodiments, the display does not include hardware for processing images or image data. The display may be any hardware configured to display images using the emission of light or another technique. For example, the display may be a liquid crystal display, e-ink display, plasma display, light emitting diode (LED) display, or other display device. In some embodiments, the display may be part of or otherwise integrated with a user input device such as a touchscreen display (e.g., projected capacitance touchscreen, resistance based touchscreen, and/or touchscreen based on other touch sensing technology). The display be a touchscreen display. Output devices 32 may also include a speaker for providing audio outputs. Output devices may further include an LED or other light source (e.g., a backlight).

In some embodiments, the trainable transceiver 10 includes one or more sensors 34. The sensors 34 may be controlled by the control circuit 22, provide inputs to the control circuit 22, and/or otherwise interact with the control circuit 22. In some embodiments, sensors 34 include one or more accelerometers, cameras, light sensors (e.g., photodetectors 36), microphones 38, and/or other sensors or input devices. Sensors 34 may further include a global positioning system (GPS) receiver. The GPS receiver may receive position information from another source (e.g., a satellite). The position may be based on GPS coordinates.

Figure 2B:
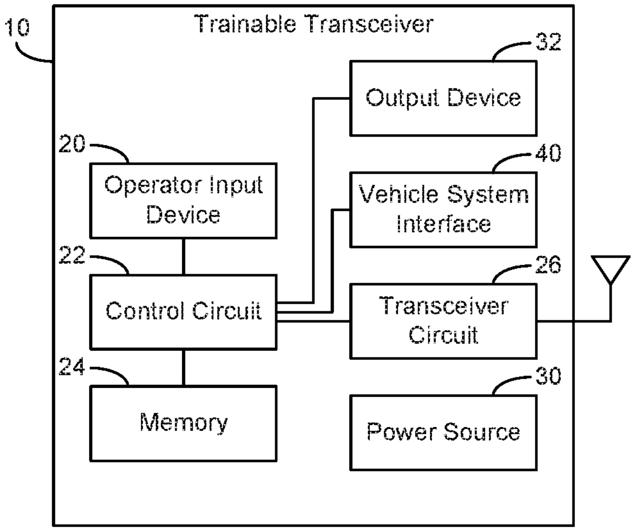
FIG. 2B illustrates an exemplary embodiment of a trainable transceiver including a vehicle system interface.

Referring now to FIG. 2B, the trainable transceiver 10 may connect to a vehicle electronics system in some embodiments. The connection to the vehicle electronics system may be made using a vehicle electronics system interface 40 included in the trainable transceiver 10. In some embodiments, the vehicle electronics system interface 40 includes physical connection such as ports, connectors, wiring, and/or other hardware used to create an electrical connection between the control circuit 22 of the trainable transceiver 10 and the vehicle electronics system. In alternative embodiments, the control circuit 22 of the trainable transceiver 10 and the vehicle electronics system are directly connected (e.g., wired such that outputs from one control circuit are received as inputs at the other control circuit and/or vice versa). In further embodiments, the vehicle electronics system interface 40 may include and/or be implemented by computer programing, code, instructions, or other software stored in memory 24 in the trainable transceiver 10 and/or the rear view mirror. Advantageously, the connection between the trainable transceiver 10 and the vehicle electronics system may allow for the trainable transceiver 10 to access, control, provide outputs to, receive inputs from, and/or otherwise communicate with components of the vehicle. The connection between the trainable transceiver 10 and the vehicle electronics system may provide an advantage of allowing the trainable transceiver 10 to make use of existing vehicle hardware for use with functions of the trainable transceiver.

The vehicle electronics system may include processors (e.g., electronic control units (ECU), engine control modules (ECM), or other vehicle processors), memory, buses (e.g., controller area network (CAN) bus, sensors, on-board diagnostics equipment (e.g., following the (OBD)-II standard or other protocol), cameras, displays, transceivers, infotainment systems, and/or other components integrated with a vehicle's electronics systems or otherwise networked (e.g., a controller area network of vehicle components). For example, the vehicle electronics system may include, be coupled to, and/or otherwise communicate with a GPS interface. The GPS interface may be configured to receive position information (e.g., from a GPS satellite source). Using the vehicle electronics system, vehicle electronics system interface 40, and/or control circuit 22, the trainable transceiver 10 may have access to position information from the GPS interface (e.g., GPS coordinates corresponding to the current location of the vehicle).

Continuing the example, the vehicle electronics system may include, be coupled to, and/or otherwise communicate with a display of the vehicle. The display may include or be a dashboard display, instrument panel display, infotainment display, rear view mirror display, rear seat display, and/or other displays in the vehicle. Using the vehicle electronics system, vehicle electronics system interface 40, and/or control circuit 22, the trainable transceiver 10 may have access to a display of the vehicle. The trainable transceiver 10 may output images (e.g., using a frame buffer) to one or more displays of the vehicle. The trainable transceiver 10 may output information related to training the trainable transceiver 10 (e.g., steps, procedures, instructions, current progress, etc.), information related to a home electronics device and/or remote device (e.g., status information, training information, identification information, etc.), diagnostic information, and/or other information accessible to the trainable transceiver 10 directly or through an intermediate device.

Continuing the example, the vehicle electronics system may include, be coupled to, and/or otherwise communicate with input/output devices of the vehicle. Input/output devices may include hardware for receiving user input and providing output to a user. Input/output device may include operator input devices, hardkey buttons, softkey buttons, touchscreens, microphones, speakers, displays, and/or other hardware. Using the vehicle electronics system, vehicle electronics system interface 40, and/or control circuit 22, the trainable transceiver 10 may receive inputs from and/or generate outputs using input/output devices of the vehicle.

Continuing the example, the vehicle electronics system may include, be coupled to, and/or otherwise communicate with additional transceivers included in the vehicle. Additional transceivers may include NFC transceivers (e.g., used for pairing a mobile communications device with an infotainment system), BLE transceivers (e.g., used for wireless communication between a mobile communications device and an infotainment system), cellular transceivers (e.g., used for accessing the internet with the vehicle infotainment system and/or other hardware), radio transceivers (e.g., for FM radio, AM radio, high definition radio, satellite radio, etc.), and/or other transceivers. Using the vehicle electronics system, vehicle electronics system interface 40, and/or control circuit 22, the trainable transceiver 10 may receive information from, send information to, control, communicate, and/or otherwise interact with additional transceivers of the vehicle. In some embodiments, the trainable transceiver 10 may use additional transceivers of the vehicle to communicate with other devices such as home electronics devices, remote devices, and/or mobile devices. In further embodiments, the trainable transceiver 10 may use additional transceivers of the vehicle to access the internet, communicate with servers, access other networks, and/or otherwise communicate with network hardware.

Figure 3A:
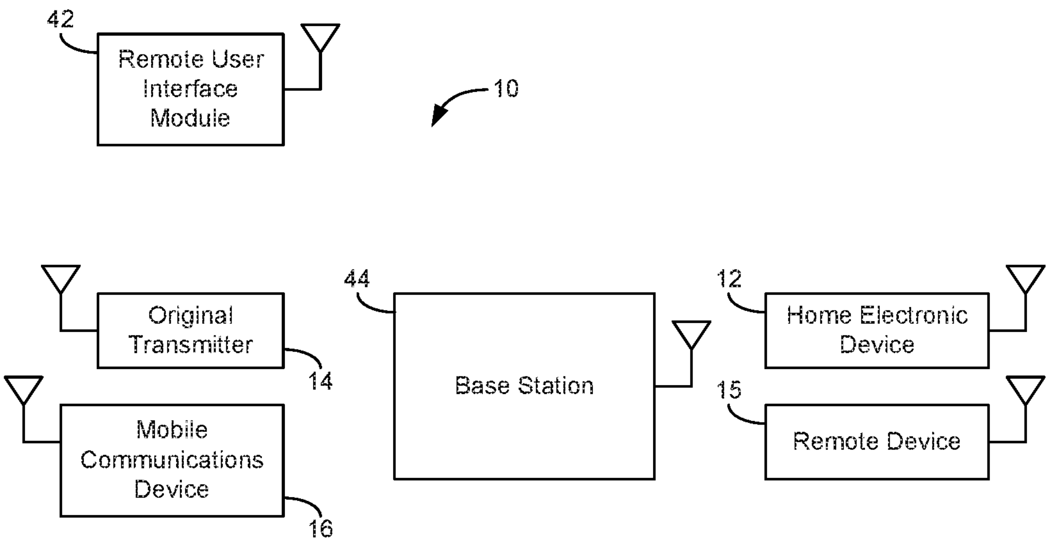
FIG. 3A illustrates a distributed trainable transceiver system including a remote user interface module and a base station according to an exemplary embodiment.
Figure 3B:
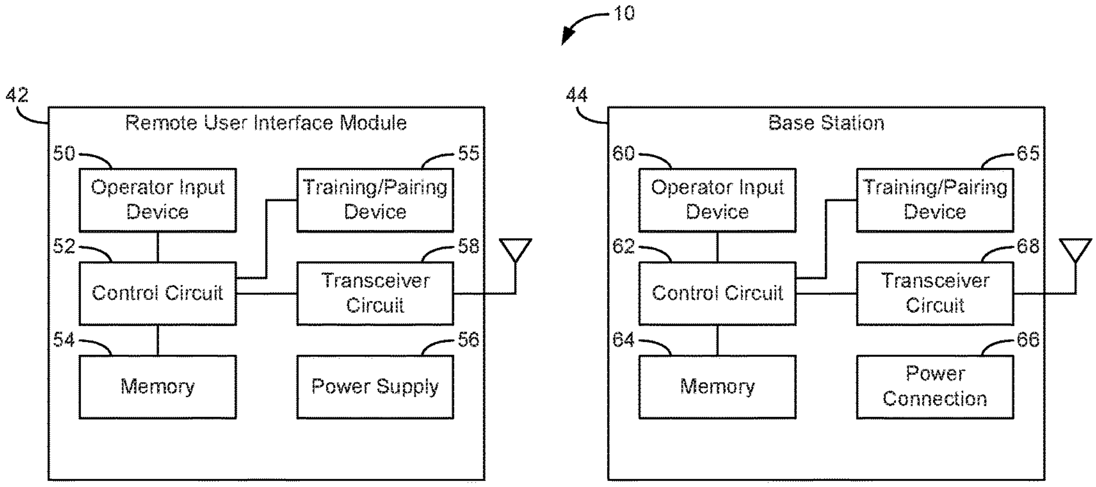
FIG. 3B illustrates an exemplary embodiment of components included in a remote user interface module and a base station.

Referring now to FIGS. 3A and 3B, in one embodiment, the trainable transceiver is a distributed system. The trainable transceiver 10 may include two modules, a remote user interface module 42 and a base station 44. The remote user interface module 42 may contain operator input devices 50, a power source 56, a control circuit 52, memory 54, output devices, and/or communications hardware. The base station 44 may contain operator input devices 60, a power source 66, a control circuit 62, memory 64, output devices, and/or communications hardware. The remote user interface module 42 may communicate with the base station 44 located apart from the remote user interface module 42. For example, the remote user interface module 42 may include a transceiver circuit 58 used to communicate with the base station 44. The base station 44 may communicate with the remote user interface module 42 using a transceiver circuit 68 and/or an additional transceiver such as those discussed above. The remote user interface module 42 may process user inputs and send information to a base station 44 with the transceiver circuit 58 configured to send an activation signal and/or other signal to another device. The base station 44 may include a more powerful (e.g., longer range) transceiver than the transceiver(s) in the remote user interface module 42.

In some embodiments, the remote user interface module 42 may contain a transceiver configured to allow communication between the remote user interface module and another device such as a remote device 15 and/or mobile communications device 16. The remote user interface module 42 may serve as a communication bridge between the remote device 15 or mobile communications device 16 and another device such as the base station 44 or the home electronics device 12 or remote device 15 in communication with the base station 44.

In other embodiments, the base station 44 may include a transceiver configured to allow communication between the remote user interface module 42 and another device such as the remote device 15 and/or mobile communications device 16. In some embodiments, the remote user interface module 42 includes a training/pairing device 55 and/or the base station 44 includes a training/pairing device 65. The training/pairing devices 55 and 65 may be or include one or more transceivers (e.g., NFC transceiver, BLE transceiver, etc.), microphones, speakers, light sensors, light sources, and/or other hardware for communication between devices. The training/pairing devices 55 and 65 may allow for communication using one or more of the techniques described above with reference to FIG. 1 (e.g., BLE communication, NFC communication, light based communication, sound based communication, etc.). The training/pairing device 55 of the remote user interface module 42 may allow the remote user interface module 42 to communicate with a mobile communications device 16 and/or a base station 44. The training/pairing device 65 of the base station 44 may allow the base station 44 to communicate with a mobile communications device 16 and/or a base station 44. Communication may include pairing a mobile communications device 16 such that communications with the mobile communications device are possible, pairing the remote user interface module 42 and the base station 44 such that communication between the two is possible, sending and/or receiving data, and/or other communication. In some embodiments, activation signal parameters, training information (e.g., device identification information), and/or other information related to the home electronics device 12 and/or remote device 15 are communicated between the mobile communications device 16 and the remote user interface module 42 and/or base station 44. In further embodiments, activation signal parameters, training information (e.g., device identification information), and/or other information related to the home electronics device 12 and/or remote device 15 are communicated between the remote user interface module 42 and base station 44. Communication may be unidirectional or bi-directional.

In some embodiments, the base station 44 is coupled to, connected to, and/or otherwise in communication with a system of the vehicle. For example, the base station 44 may be plugged into a power source of the vehicle such as a USB port, 12 volt power port, cigarette lighter, and/or other power source of the vehicle. In further embodiments, the base station 44 may be in communication with a vehicle electronics system. The remote user interface module 42 may be located within the vehicle remote from the base station 44. For example, the remote user interface module 42 may be coupled to a vehicle visor, rear view mirror, windshield, center counsel, and/or other vehicle component.

Figure 4:
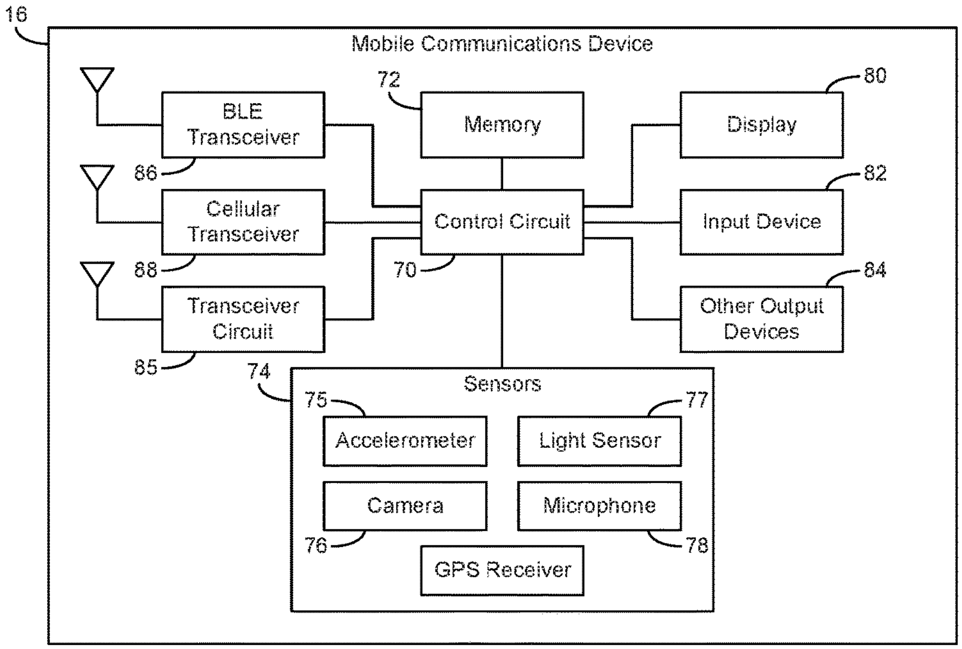
FIG. 4 illustrates an exemplary embodiment of the components included in a mobile communications device.

Referring now to FIG. 4, an exemplary embodiment of a mobile communications device is illustrated. The mobile communications device 16, which may communicate with the trainable transceiver 10 in some embodiments of the trainable transceiver 10, may be a device purchased by a consumer separately from the trainable transceiver 10. For example, the mobile communications device 16 may be a cellular telephone purchased from a third party retailer. In some embodiments, the mobile communications device 16 (e.g., smartphone, tablet, cellular telephone, laptop, key fob, dongle, etc.) includes a control circuit 70. The control circuit 70 may contain circuitry, hardware, and/or software for facilitating and/or performing the functions described herein. The control circuit 70 may handle inputs, process inputs, run programs, handle instructions, route information, control memory, control a processor, process data, generate outputs, communicate with other devices or hardware, and/or otherwise perform general or specific computing tasks. In some embodiments, the control circuit 70 includes a processor. In some embodiments, the control circuit 70 includes memory. The control circuit 70 may handle computation tasks associated with placing phone calls, running an operating system, running applications, displaying information, general computing, and/or tasks associated with providing smartphone, tablet, laptop and/or other device functions. In some embodiments, the control circuit 70 may include and/or be one more systems on a chip (SoCs), application specific integrated circuits (ASICs), one or more field programmable gate arrays (FPGAs), a digital-signal-processor (DSP), a group of processing components, and/or other suitable electronic processing components.

The mobile communications device 16 may include memory 72. Memory 72 is one or more devices (e.g. RAM, ROM, Flash Memory, hard disk storage, etc.) for storing data and/or computer code for facilitating the various processes described herein. Memory 72 may be or include non-transient volatile memory or non-volatile memory. Memory 72 may include database components, object code components, script components, or any other type of information structure for supporting various activities and information structures described herein. Memory 72 may be communicably connected to the control circuit 70 and provide computer code and/or instructions to the control circuit 70 for executing the processes described herein. For example, memory 72 may contain computer code, instructions, and/or other information of implementing an operating system, one or more applications, and/or other programs.

In some embodiments, the mobile communications device 16 includes one or more sensors 74. The sensors 74 may be controlled by the control circuit 70, provide inputs to the control circuit 70, and/or otherwise interact with the control circuit 70. In some embodiments, sensors 76 include one or more accelerometers 75, cameras 76, light sensors 77, microphones 78, and/or other sensors or input devices. Sensors may further include a global positioning system (GPS) receiver 79. The GPS receiver 79 may receive position information from another source (e.g., a satellite). The position may be based on GPS coordinates.

The mobile communications device may include output devices. In some embodiments, the output devices are controlled by the control circuit 70, provide input to the control circuit 70, communicate output from the control circuit 70 to a user or other device, and/or are otherwise in communication with the control circuit 70. Output devices may include a display 80. The display 80 allows for visual communication with a user. The display 80 may be configured to output a visual representation based on computer instructions, control signals, computer code, frame buffers, and/or other electronic signals or information. In some embodiments, the display 80 includes a graphics processing unit (GPU), controller, and/or other hardware to facilitate the handling of and display of graphics information. In other embodiments, the display 80 does not include hardware for processing images or image data. The display 80 may be any hardware configured to display images using the emission of light or another technique. For example, the display 80 may be a liquid crystal display, e-ink display, plasma display, light emitting diode (LED) display, or other display device. In some embodiments, the display 80 may be part of or otherwise integrated with a user input device 82 such as a touchscreen display (e.g., projected capacitance touchscreen, resistance based touchscreen, and/or touchscreen based on other touch sensing technology). The display 80 be a touchscreen display. The mobile communications device may include other output devices 84. Output devices may also include a speaker for providing audio outputs. Output devices may further include a flash. A flash may be associated with a camera and may be an LED or other light source.

The mobile communications device 16 may include a transceiver circuit 85. The transceiver circuit 85 may be a radio frequency transceiver, cellular transceiver, and/or other transceiver. The transceiver circuit 85 may provide communication between the mobile communication device and a cell tower, voice network, data network, communication network, other device, and/or other hardware components used in communication. The mobile communications device 16 may access the internet and/or other networks using the transceiver circuit 85. In some embodiments, the trainable transceiver 10 and mobile communications device 16 communicate using the transceiver circuit 85 of the mobile communications device 16 and the transceiver circuit 26 of the trainable transceiver 10. Other intermediary devices and/or hardware (e.g., network components) may facilitate communication between the mobile communications device 16 and the trainable transceiver 10. In some embodiments, the mobile communications device 16 may have access to activation signal parameters, training information (e.g., device identification information), and/or other information related to a home electronics device and/or remote device. The mobile communications device 16 may have access to this information through a variety of sources and techniques as discussed in more detail herein. The mobile communications device 16 may transmit activation signal parameters, training information (e.g., device identification information), and/or other information related to a home electronics device and/or remote device using the transceiver circuit 85 of the mobile electronics device 16. This information may be received by the trainable transceiver 10 using the transceiver circuit 26 of the trainable transceiver 10.

In some embodiments, the mobile communications device 16 includes an NFC transceiver. The NFC transceiver may allow the mobile communications device to wirelessly communicate with the trainable transceiver 10 using NFC. As discussed above, the NFC transceiver of the mobile communications device 16 and the NFC transceiver of the trainable transceiver may allow for wireless communication between the trainable transceiver 10 and the mobile communications device 16. In some embodiments, the wireless communication via the NFC transceivers allows for the trainable transceiver 10 and mobile communications device 16 to be paired and therefore allow for further communication using the NFC transceivers and/or other transceivers described herein.

In some embodiments, the mobile communications device 16 includes a BLE transceiver 86. The BLE transceiver 86 may allow the mobile communications device 16 to wirelessly communicate with the trainable transceiver 10 using a Bluetooth protocol such as BLE. As discussed above, the BLE transceiver 86 of the mobile communications device 16 and the BLE transceiver of the trainable transceiver 10 may allow for wireless communication between the trainable transceiver 10 and the mobile communications device 16. In some embodiments, the wireless communication via the BLE transceivers allows for the trainable transceiver 10 and mobile communications device 16 to be paired and therefore allow for further communication using the BLE transceivers and/or other transceivers described herein. Alternatively, the trainable transceiver 10 and the mobile communications device 16 may be paired by another technique (e.g., using the NFC transceivers) which allows for further communication using BLE transceivers In further embodiments, the mobile communications device 16 includes a WiFi transceiver.

Referring generally to FIGS. 1-4, the mobile communications device 16 may include an application configured to interact with the mobile communications device 16 and the trainable transceiver 10. For example, the application may control a transceiver of the mobile communications device 16 for the function of communicating with the trainable transceiver 10. The application may facilitate communication between the mobile communications device 16 and the trainable transceiver 10, allow a user to configure or train the trainable transceiver 10, be used to acquire activation signal parameters stored locally (e.g., with the application in memory) and/or remotely (e.g., on a server accessible to the application using a connection to the internet provided by the mobile communications device 16), be used to transmit activation signal parameter to the trainable transceiver 10, and/or perform other functions described herein with respect to the mobile communications device 16 and/or trainable transceiver 10.

In some embodiments, the trainable transceiver 10 may access the internet using a communications connection with the mobile electronics device 16. For example, the trainable transceiver 10 may transmit requests, control instructions, and/or other information to the mobile communications device 16 causing the mobile communications device to access information, send information, and/or otherwise retrieve information using an internet connection (e.g., through a cellular transceiver 88 and/or other transceiver). The mobile communications device 16 may transmit the resulting information and/or data to the trainable transceiver 10. The mobile communications device 16 may serve as intermediary device which is used by the trainable transceiver 10 to communicate with other devices (e.g., servers, networking equipment, other mobile communications device, home electronics devices, remote devices, and/or other devices). In some embodiments, the trainable transceiver 10 may use the mobile communications device 16 to retrieve activation signal parameters, training information (e.g., device identification information), and/or other information related to a home electronics device and/or remote device. Using access to the internet and/or otherwise using the mobile communications device 16, the trainable transceiver may access the cloud computing system 18 (e.g., IP addressable servers, a cluster of computers, etc.).

Figure 5A:
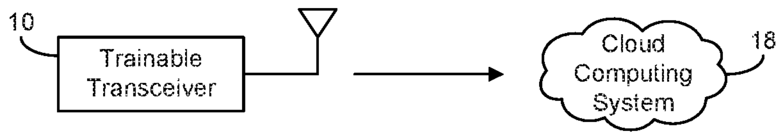
FIG. 5A illustrates an exemplary embodiment of a trainable transceiver in communication with a cloud computing system computing system for transmitting information to the cloud computing system.
Figure 5B:
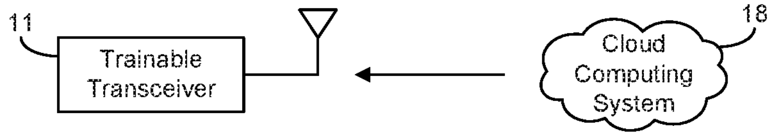
FIG. 5B illustrates an exemplary embodiment of a trainable transceiver in communication with a cloud computing system for receiving information from the cloud computing system.

Referring now to FIGS. 5A-5B, a trainable transceiver may be in communication with the cloud computing system (e.g., a cloud computing system based computer system architecture for storing, managing, and/or communicating information as described in more detail with reference to FIG. 7). In one embodiment, the communication between the trainable transceiver 10 is unidirectional with the trainable transceiver 10 being configured to transmit information to the cloud computing system 18. Information may include activation signal parameters, training information, status information, notifications, diagnostic information, and/or other information related to a home electronics device, remote device, and/or other device. For example, the trainable transceiver 10 may transmit activations signal parameters and device identification information corresponding to a particular home electronics device (e.g., a garage door opener) using a cellular transceiver. In some embodiments, the trainable transceiver 10 transmits information to the cloud computing system 18 using, in part, the internet. For example, the trainable transceiver 10 may use a client, a web browser, an internet protocol, and/or other internet communication technique in conjunction with internet access (e.g., provided by a cellular transceiver) to communicate information to the cloud computing system 18. The cloud computing system 18 may receive information transmitted by the trainable transceiver 10 using internet connected hardware. The cloud computing system 18 may include a server with a connection to the internet. The cloud computing system 18 may include further hardware and/or software which facilitates reception of information from the trainable transceiver 10 (e.g., as discussed with reference to FIG. 7). In other embodiments, the communication between the trainable transceiver 10 and the cloud computing system 18 is unidirectional with the trainable transceiver 10 receiving information (e.g., activation signal parameters, training information, status information, and/or other information related to a home electronics device, remote device, and/or other device) from the cloud computing system 18 in one embodiment.

In still further embodiments, the communication between the trainable transceiver 10 and the cloud computing system 18 may be bi-directional. For example, the trainable transceiver may both send information to the cloud computing system 18 and receive information from the cloud computing system 18. Sending and receiving information may occur contemporaneously. In other embodiments, the trainable transceiver 10 may transmit information to the cloud computing system 18 without receiving information in return. At a later time, the trainable transceiver 10 may receive information from the cloud computing system 18.

Still referring to FIGS. 5A-5B, the cloud computing system 18 may be used to transfer information from a first trainable transceiver 10 to a second trainable transceiver 11 in some embodiments. For example, a user may desire to copy the configuration of a first trainable transceiver 10 in a first vehicle to a second trainable transceiver 11 in a second vehicle. The user may have trained the first trainable transceiver 10 to control one or a plurality of home electronics devices, remote devices and/or other devices (e.g., by sending activation signals formatted for a particular device). While using a second vehicle, the user may desire for the second trainable transceiver 11 in the second vehicle to be configured the same or similarly to the first trainable transceiver 10 in the first vehicle. Advantageously, the cloud computing system 18 may be used to store configuration information for a trainable transceiver 10 thus allowing the configuration information to be transmitted to a second trainable transceiver 11. Configuration information may include activation signal parameters, training information, status information, notifications, diagnostic information, and/or other information related to a home electronics device, remote device, and/or other device, operator input device assignment information for one or more devices (e.g., which button controls which device), settings, preferences, and/or other information related to a trainable transceiver, associated application, and/or device. The configuration information may be acquired by the cloud computing system 18 from a trainable transceiver 10. For example, the first trainable transceiver 10 may transmit configuration information to the cloud computing system 18. The second trainable transceiver 11 may then request the configuration information form the cloud computing system 18, the cloud computing system 18 may transmit the information to the second trainable transceiver 11 (e.g., push the configuration information to the second trainable transceiver), and/or the second trainable transceiver 11 may otherwise receive the configuration information from the cloud computing system 18.

Referring now to FIG. 5A, a first trainable transceiver 10 may communicate configuration information and/or other information to the cloud computing system 18. The first transceiver 10 may communicate information to the cloud computing system 18 using one or more of the techniques described herein. The communication of configuration information to the cloud computing system 18 may occur at a first time. The cloud computing system 18 may store the configuration information (e.g., on a server of other hardware part of the cloud computing system architecture). In one embodiment, the cloud computing system 18 requests the transmission of information. For example, the cloud computing system 18 sends a request transmission to the first trainable transceiver 10. The first trainable transceiver 10 then transmit information to the cloud computing system 18 in response to the request transmission. In other embodiments, the trainable transceiver 10 may transmit the information to the cloud computing system 18 without first receiving a request transmission. For example, the trainable transceiver 10 may transmit configuration information to the cloud computing system 18 continuously, periodically (e.g., every 5 minutes), on power up, prior to power down, in response to a user input received at the trainable transceiver 10 (e.g., a user input on an operator input device of the trainable transceiver), in response to a communication from another device (e.g., a mobile communications device), in response to a user input received by a mobile communications device and communicated to the trainable transceiver 10, as a result of a scheduled transmission (e.g., nightly at 11 p.m.), and/or in response to another triggering event. In embodiments where a request transmission is used, the request transmission may be based and/or sent in response to one the previously listed events or triggers.

Referring now to FIG. 5B, a second trainable transceiver 11 may receive configuration information and/or other information to the cloud computing system 18. The second transceiver 11 may receive information from the cloud computing system 18 using one or more of the techniques described herein. The communication of configuration information from the cloud computing system 18 to the second trainable transceiver 11 may occur at a second time. The cloud computing system 18 may have access to configuration information (e.g., stored on a server of other hardware part of the cloud computing system architecture). For example, the cloud computing system 18 may be storing configuration information received from a first trainable transceiver 10. This information may be transmitted to a second trainable transceiver 11. In one embodiment, the second trainable transceiver 11 requests the transmission of information. For example, the second trainable transceiver 11 may send a request transmission to the cloud computing system 18. The cloud computing system 18 may then transmit information to the second trainable transceiver 11 in response to the request transmission. In other embodiments, the cloud computing system 18 may transmit the information to the second trainable transceiver 11 without first receiving a request transmission. For example, the cloud computing system 18 may transmit configuration information to the second trainable transceiver 11 continuously, periodically (e.g., every 5 minutes), on power up, prior to power down, in response to a user input received at the trainable transceiver (e.g., a user input on an operator input device of the trainable transceiver), in response to a communication from another device (e.g., a mobile communications device), in response to a user input received by a mobile communications device and communicated to the trainable transceiver 11, as a result of a scheduled transmission (e.g., nightly at 11 p.m.), when received configuration information is determined by cloud computing system 18 hardware and/or software to differ from stored configuration information (e.g., with the received information being sent), and/or in response to another triggering event. The cloud computing system 18 may push configuration information to the second trainable transceiver 11. In embodiments where a request transmission is used, the request transmission may be based and/or sent in response to one the previously listed events or triggers.

Figure 6A:
FIG. 6A illustrates an exemplary embodiment of a trainable transceiver in communication with a cloud computing system for transmitting information to the cloud computing system using a mobile communications device.
Figure 6B:
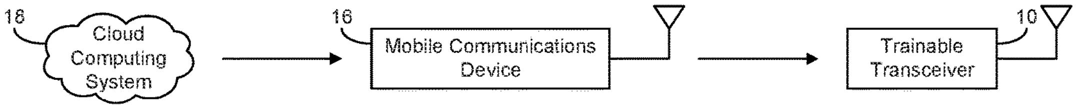
FIG. 6B illustrates an exemplary embodiment of a trainable transceiver in communication with a cloud computing system for receiving information from the cloud computing system using a mobile communications device.

Referring now to FIGS. 6A and 6B, the trainable transceiver 10 may communicate with the cloud computing system 18 using an intermediate device. In one embodiment, the intermediate device is a mobile communications device 16. The trainable transceiver 10 may not include hardware for connecting to the internet. The trainable transceiver 10 may have hardware for communicating with a mobile communications device as described with reference to FIGS. 1-4. For example, the trainable transceiver 10 may include a Bluetooth transceiver which the trainable transceiver 10 uses to communicate with the mobile communications device 16 having a Bluetooth transceiver. The mobile communications device 16 may have hardware with which the mobile communications device 16 can access the internet and/or another network. For example, the mobile communications device 16 may include a cellular transceiver used to connect to a voice and/or data network. The mobile communications device 16 may access the internet. Using access to the internet and/or access to a network to which the cloud computing system 18 is configured to communicate, the mobile communications device 16 may communicate with the cloud computing system 18.

Referring now to FIG. 6A, the trainable transceiver 10 may have access to the cloud computing system 18 by communicating with the mobile electronics device 16. For example, the trainable transceiver 10 may send instructions and/or information to the mobile communications device 16 which the mobile communications device 16 further transmits to the cloud computing system 18. The instructions and/or information transmitted by the trainable transceiver 10 to the mobile communications device 16 may cause the mobile communications device 16 to further communicate with the cloud computing system 18. The mobile communications device 16 may act a s a repeater, retransmitted, and/or other device for forwarding communications. The combination of the trainable transceiver 10 and mobile communications device 16 may provide for one or more of the functions described with reference to FIG. 5A above. The mobile communications device 16 may function solely as hardware used by the trainable transceiver 10 to access the internet in some embodiments. In other words, the mobile communications device 16 and its communication with the trainable transceiver 10 may take the place of a transceiver of the trainable transceiver 10 for purposes of communicating with the cloud computing system 18.

Referring now to FIG. 6B, the trainable transceiver 10 may receive information (e.g., configuration information, activation signal parameters, training information, status information, etc.) from the cloud computing system 18 using an intermediate mobile communications device 16. For example, the cloud computing system 18 may send instructions and/or information to the mobile communications device 16 which the mobile communications device 16 further transmits to the trainable transceiver 10. The instructions and/or information transmitted by the cloud computing system 18 to the mobile communications device 16 may cause the mobile communications device 16 to further communicate with the trainable transceiver 10. The mobile communications device 16 may act a s a repeater, retransmitted, and/or other device for forwarding communications. The combination of the trainable transceiver 10 and mobile communications device 16 may provide for one or more of the functions described with reference to FIG. 5B above. The mobile communications device 16 may function solely as hardware used by the trainable transceiver 10 to access the internet in some embodiments. In other words, the mobile communications device 16 and its communication with the trainable transceiver 10 may take the place of a transceiver of the trainable transceiver 10 for purposes of communicating with the cloud computing system 18.

Figure 6C:
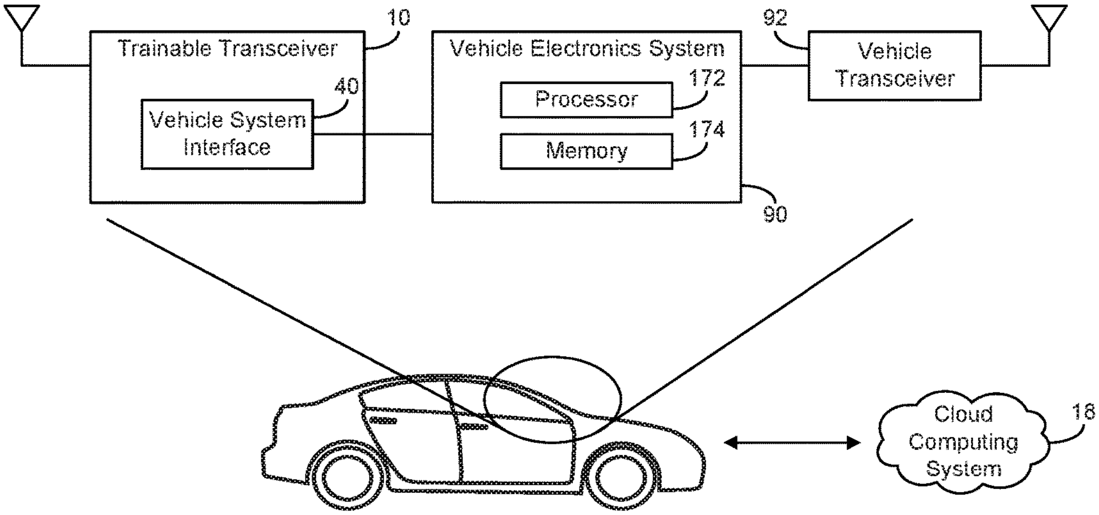
FIG. 6C illustrates an exemplary embodiment of a trainable transceiver communicating with a cloud computing system using a vehicle transceiver.
Figure 12A:
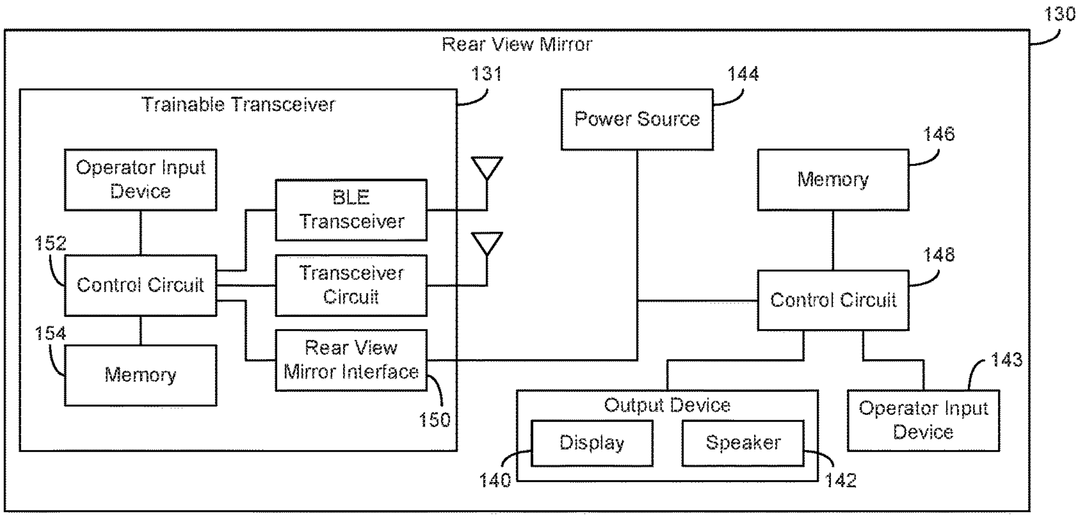
FIG. 12A illustrates an embodiment of a trainable transceiver coupled to and/or integrated with a rear view mirror of a vehicle.
Figure 12B:
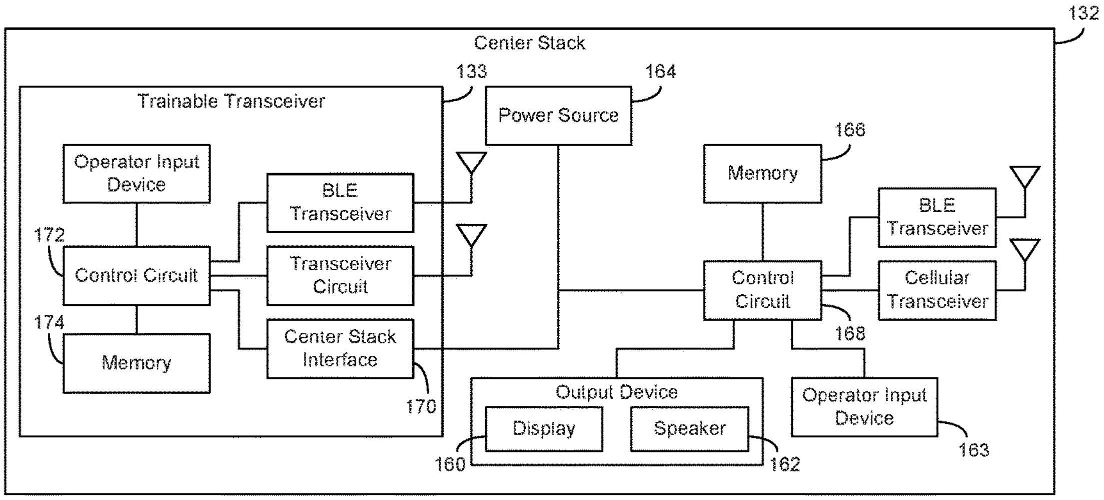
FIG. 12B illustrates an exemplary embodiment of a trainable transceiver coupled to and/or integrated with a center stack of a vehicle.

In other embodiments, the trainable transceiver 10 may communicate with the cloud computing system 18 using additional and/or other intermediate devices or hardware. For example, the trainable transceiver 10 may be coupled to or otherwise have access to a transceiver 92 included in a vehicle electronics system 90 as depicted in FIGS. 6C and 12A-12B. Using the transceiver 92 (e.g., a cellular transceiver such as a transceiver configured to communicate with a voice and/or data cell network) included in the vehicle electronics system 90, the trainable transceiver 10 may have access to internet through which the trainable transceiver 10 may communicate with the cloud computing system 18. In other embodiments, the trainable transceiver 10 may be in communication with a transceiver included in a rear view mirror. The trainable transceiver 10 may use the transceiver of the rear view mirror to access the internet for purposes of communicating with the cloud computing system 18 and/or otherwise use the transceiver to communicate with the cloud computing system 18.

Figure 7:
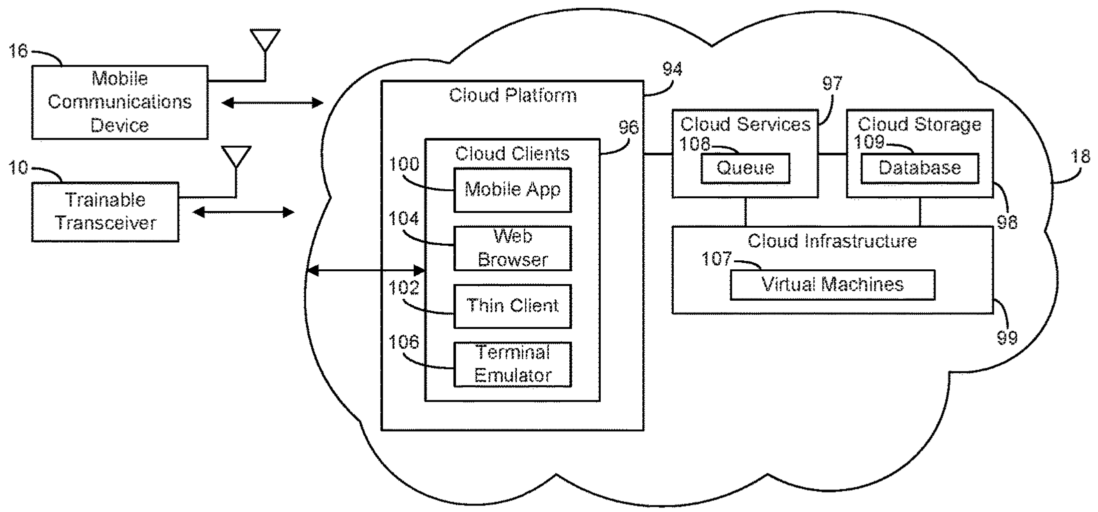
FIG. 7 illustrates an exemplary embodiment of components included in a cloud computing system.

Referring now to FIG. 7, a block diagram of an exemplary embodiment of a cloud computing system 18 is illustrated. The cloud computing system 18 may include one or more cloud computing system platforms 94. The cloud computing system platform 94 may be hardware and/or software which provides an interface for communicating with the cloud computing system 18. For example, the cloud computing system platform 94 may be or include a sever(s) for handling communication with the cloud computing system 18 via a web browser running on remote hardware (e.g., a trainable transceiver). The cloud computing system platform 94 may allow communication between hardware and/or software of the cloud computing system 18 and the trainable transceiver 10 and/or the mobile communications device 16 using one or more of the techniques described with reference to FIGS. 5A-6B and/or described herein.

The cloud computing system platform 94 may further include one or more cloud computing system clients 96 used in communicating with the cloud computing system. Cloud computing system clients 96 may be software and/or hardware used for communicating with a corresponding cloud computing system client (e.g., program, application, web browser, etc.) running on a remote device. For example, the trainable transceiver 10 may run a web browser which navigates to a web site hosted by hardware (e.g., a server) included in the cloud computing system 18. The cloud computing system client 96 may be software running on the server for the purposes of hosting, serving, and/or otherwise allowing the web browser to communicate with the cloud computing system 18 (e.g., cloud computing system services 97, cloud computing system storage 98, cloud computing system infrastructure 99, and/or hardware or software implementing the same). In some embodiments, the web browser cloud computing system client 104 may be or include a web platform used in communication between the cloud computing system 18 and other devices (e.g., the mobile communications device 16 and/or the trainable transceiver 10). In some embodiments, the web browser running on the device only handles inputs and outputs with the cloud computing system 18 performing all other computing tasks. For example, the web browser may display images according to a frame buffer received from the cloud computing system 18 and transmit input information to the cloud computing system 18 with the cloud computing system 18 handling or processing the inputs, performing computational tasks based on the inputs, and/or generating a frame buffer which is transmitted to the web browser on the device for display using the hardware of the device. The web browser cloud computing system client 104 may run on the trainable transceiver 10, mobile communications device 16, and/or other device remote from the cloud computing system 18 with a corresponding cloud computing system client 96 and/or the cloud computing system platform 98 facilitating communication between the cloud computing system and 18 the device (e.g., routing communication, formatting information, serving information, receiving information, sending instructions, formatting instructions, communicating with other cloud computing system components, etc.). The web browser running on the device may allow communication with a cloud computing system application or service (e.g., running on cloud computing system hardware such as a server).

In some embodiments, the cloud computing system clients 96 include a mobile application 100. The trainable transceiver 10, mobile communications device 16, and/or other device may include a mobile application (e.g., program) running thereon. The mobile application 100 may be configured to format instructions and/or information for transmission to the cloud computing system 18. The information and/or instructions may be receive by the cloud computing system 18 using a corresponding cloud computing system client (e.g., hardware such as a server, software for handling inputs, etc.) corresponding to the mobile application 100. The mobile application running on the device may further be configured to interpret, handle, process, display, and/or otherwise manipulate instructions and/or information received from the corresponding cloud computing system client. In some embodiments, the mobile application running on the device only handles inputs and outputs with the cloud computing system 18 performing all other computing tasks. For example, the mobile application may display images according to a frame buffer received from the cloud computing system 18 and transmit input information to the cloud computing system 18 with the cloud computing system 18 handling or processing the inputs, performing computational tasks based on the inputs, and/or generating a frame buffer which is transmitted to the mobile application on the device for display using the hardware of the device. The mobile application 100 cloud computing system client may run on the trainable transceiver 10, mobile communications device 16, and/or other device remote from the cloud computing system 18 with a corresponding cloud computing system client 96 and/or the cloud computing system platform 94 facilitating communication between the cloud computing system 18 and the device (e.g., routing communication, formatting information, serving information, receiving information, sending instructions, formatting instructions, communicating with other cloud computing system components, etc.). The mobile application running on the device may allow communication with a cloud computing system application or service (e.g., running on cloud computing system hardware such as a server).

In some embodiments, the cloud computing system clients include a thin client 102. The trainable transceiver 10, mobile communications device 16, and/or other device may include a thin client running thereon and/or otherwise implement a thin client. The trainable transceiver 10 is a thin client in some embodiments. The thin client 102 may be configured to format instructions and/or information for transmission to the cloud computing system 18. The information and/or instructions may be receive by the cloud computing system 18 using a corresponding cloud computing system client (e.g., hardware such as a server, software for handling inputs, etc.) corresponding to the thin client 102. The thin client 102 may further be configured to interpret, handle, process, display, and/or otherwise manipulate instructions and/or information received from the corresponding cloud computing system client 96. In some embodiments, the thin client only handles inputs and outputs with the cloud computing system 18 performing all other computing tasks. For example, the thin client may display images according to a frame buffer received from the cloud computing system 18 and transmit input information to the cloud computing system 18 with the cloud computing system 18 handling or processing the inputs, performing computational tasks based on the inputs, and/or generating a frame buffer which is transmitted to the thin client for display using the hardware of the thin client and/or the device on which the thin client is running. The thin client cloud computing system client 102 may run on a trainable transceiver, mobile communications device, and/or other device remote from the cloud computing system with a corresponding cloud computing system client and/or the cloud computing system platform facilitating communication between the cloud computing system and the device (e.g., routing communication, formatting information, serving information, receiving information, sending instructions, formatting instructions, communicating with other cloud computing system components, etc.).

Alternatively, the device may be a thin client. The thin client may allow communication with a cloud computing system 18 application or service (e.g., running on cloud computing system hardware such as a server). In other embodiments, the cloud computing system clients 96 may be and/or include a terminal emulator 106.

In some embodiments, the cloud computing system 18 includes cloud computing system services 97. Cloud computing system services 97 may be implemented using hardware and/or software included in the cloud computing system. For example, cloud computing system services 97 may be implemented as one or more programs running on one or more servers. The hardware used to provide cloud computing system services 97 may be connected to other hardware included in the cloud computing system 18. For example, a first server running a program for providing a cloud computing system service (e.g., computational tasks based on user input) may communicate with a second server used to implement a cloud computing system platform and/or cloud computing system client for communicating with a remote device (e.g., mobile communications device 16, trainable transceiver 10, etc.).

Cloud computing system services 97 may include software as a service, platform as a service, infrastructure as a service, and/or other service models. The services proved by cloud computing system services 97 may be used to implement the functions of the trainable transceiver systems described herein. For example, cloud computing system services 97 may be used to store, allow manipulation of, and/or provide access to information related to the trainable transceiver systems described herein. For example, this information may include activation signal parameters, training information, status information, notifications, diagnostic information, profile configurations and/or information, configuration information, identification information, and/or other information related to a home electronics device, remote device, trainable transceiver, vehicle, mobile communications device, and/or other device. Cloud computing system services 97 may include other services besides information storage, access, and editing. For example, cloud computing system services 97 may be used to facilitate communication between two or more devices as described herein (e.g., using cloud computing system hardware). Other cloud computing system services are possible and maybe used to facilitate and/or perform the functions described herein.

In some embodiments, inputs to cloud computing system services 97 may be received by cloud computing system services hardware and/or software from hardware and/or software in communication with the trainable transceiver 10, mobile communications device 16, and/or other device. For example, hardware and/or software implementing a cloud computing system platform and/or cloud computing system client may communicate with hardware implementing cloud computing system services. In this way, a cloud computing system platform 94 and/or client 96 may receive an input from a mobile communications device 16, trainable transceiver 10, or other device and forward the input to cloud computing system 18 services hardware for processing. The mobile communications device 16, trainable transceiver 10, and/or other device may generate the input sent to the cloud computing system platform 94 and/or cloud computing system client 96 in response to a user input received by the device (e.g., a button press). Thus, a user input received at a mobile communications device 16, trainable transceiver 10, and/or other device may be processed by a cloud computing system 18 service. Communication may be between two or more servers using the internet and/or other networks and/or communication protocols. Similar communication techniques may be used to provide an output from cloud computing system 18 services to one or more mobile communications device 16, trainable transceiver 10, and/or other device. In further embodiments, a home electronics device, remote device, and/or other device is in communication with the cloud computing system 18 using the same or similar communication techniques. The cloud computing system 18 may be configured to receive inputs from and/or provide outputs to home electronics device, remote device, and/or other device in addition to mobile communications device 16, trainable transceiver 10, and/or other devices. In further embodiments, inputs and/or outputs may be based on information, instructions, events, and/or other sources or conditions which are not triggered directly and/or indirectly by user input. For example, a home electronics device may communicate status information to the cloud computing system 18 on a periodic basis.

In some embodiments, cloud computing system 18 services includes a queue 108 and/or other information traffic handling, prioritization, and/or routing software and/or hardware. The queue 108 and/or other hardware and/or software may be used to handle inputs to and/or outputs from cloud computing system 18 service. Other functions may include retrieving information from other cloud computing system 18 hardware, handling information requests, and/or otherwise performing arbitration tasks, networking tasks, information processing tasks, task managing tasks, and/or other functions.

In some embodiments, the cloud computing system includes cloud computing system storage 98. Cloud computing system storage 98 may be or include memory for storing information and/or data. The memory included in cloud computing system storage 98 may be located in or on a server. The server may be distinct from servers implementing other components of the cloud computing system 18. For example, the server implementing cloud computing system storage 98 may be a separate server in communication with another server implementing cloud computing system 18 services. Memory may be one or more devices (e.g. RAM, ROM, Flash Memory, hard disk storage, etc.) for storing data and/or computer code for facilitating the various processes described herein. Memory may be or include non-transient volatile memory or non-volatile memory. Memory may include database components, object code components, script components, or any other type of information structure for supporting various activities and information structures described herein.

In some embodiments, cloud computing system storage 98 may include one or more databases 109. Databases 109 may be created, maintained, manipulated, stored on, and/or otherwise implemented using memory included in cloud computing system storage 98. The database(s) 109 may contain information such as include activation signal parameters, training information, status information, notifications, diagnostic information, profile configurations and/or information, configuration information, identification information, and/or other information related to a home electronics device, remote device, trainable transceiver, vehicle, mobile communications device, and/or other device. The database 109 may store information indexed to a particular device, particular user, particular configuration profile, and/or otherwise indexed. For example, activation signal parameters may be stored in a database 109 as a tuple including device identification information for which the activation signal parameters correspond. In some embodiments, a unique database 109 or group of databases 109 may be stored for each trainable transceiver and/or a particular user having one or more trainable transceiver. Different data storage architectures are possible.

In some embodiments, the cloud computing system includes cloud computing system infrastructure 99. Cloud computing system infrastructure 99 may include hardware and/or software for implementing the functions described herein. For example, cloud computing system infrastructure 99 may include one or more servers and/or software for running the servers (e.g., managing programs running on the server, communicating with other servers or hardware, etc.). A cloud computing system 18 component may be implemented with one or more servers. For example, each cloud computing system 18 component (e.g., cloud computing system platform 94, cloud computing system 97 services, cloud computing system storage 98, etc.) may be a single server. Alternatively, a cloud component may be implemented with a plurality of servers. For example, information may be stored across a plurality of servers implementing cloud computing system storage 98. Cloud computing system infrastructure 99 may include virtual machines 107, load balances, networks, and/or other components. For example, virtual machines 107 may be implemented to emulate a computer for use in facilitating the functions of the trainable transceiver system described herein. The cloud computing system infrastructure 99 may facilitate communication between cloud computing system components and/or between cloud computing system components and other devices (e.g., a trainable transceiver, mobile communications device, and/or other device).

Figure 8A:
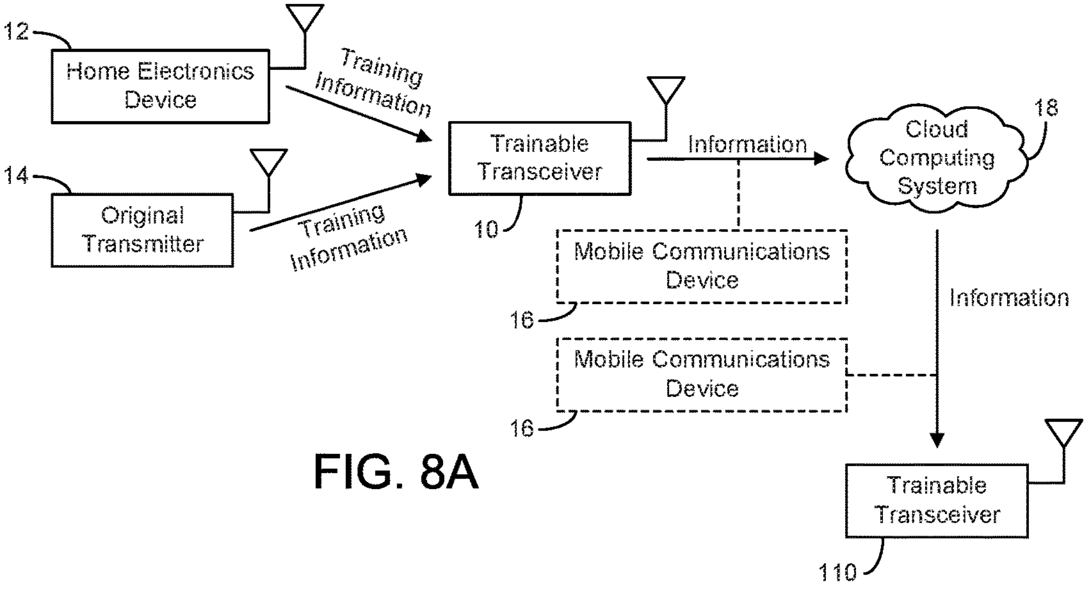
FIG. 8A illustrates an exemplary embodiment of two trainable transceivers in communication with a cloud computing system.

Referring now to FIG. 8A, a cloud computing system 18 may receive information related to a home electronics device 12, remote device, trainable transceiver 10, vehicle, mobile communications device 16, and/or other device. This information may include activation signal parameters, training information, status information, notifications, diagnostic information, profile configurations and/or information, configuration information, identification information, and/or other information related to a home electronics device 12, remote device, trainable transceiver 10, vehicle, mobile communications device 06, and/or other device. The cloud computing system 18 may receive this information and/or other information from a variety of sources using one or more of the communication techniques described here.

In some embodiments, the cloud computing system 18 may receive information such as activation signal parameters, training information, and/or other information from a trainable transceiver 10. One or more of the communication techniques discussed with reference to FIGS. 5A-6C may be used in order to communicate information from the trainable transceiver 10 to the cloud computing system 18. In some embodiments, the trainable transceiver 10 receive activation signal parameters, training information (e.g., device identification information), and/or other information from the home electronics device 12, remote device, and/or other device. This information may then be forwarded to the cloud computing system 18. For example, the trainable transceiver 10 may receive status information (e.g., a garage door is closed) from the home electronics device 12. In other embodiments, the trainable transceiver 10 may indirectly receive activation signal parameters, training information (e.g., device identification information), and/or other information from the home electronics device 12, remote device, and/or other device. For example, the trainable transceiver 10 may receive information during a training process. The training process may be or include components such as a user entering information about the device into the trainable transceiver 10 (e.g., make, model, serial number, etc.), the trainable transceiver 10 receiving information from the mobile communications device 16, the trainable transceiver 10 acquiring information based on an image of the original transmitter 14, the trainable transceiver 10 acquiring information based on a machine readable image, the trainable transceiver 10 acquiring information from a server, and/or the trainable transceiver 10 otherwise acquiring the information. In further embodiments, the trainable transceiver 10 may acquire information from a signal received from the original transmitter 14. For example, the trainable transceiver 10 may receive a signal from the original transmitter 14 using a transceiver circuit. The trainable transceiver 10 may then analyze the signal received (e.g., using a control circuit) to determine information such as activation signal parameters, training information, and/or other information related to the home electronics device 12, remote device, and/or other device associated with the original transmitter 14.

In some embodiments, the cloud computing system 18 may receive information such as activation signal parameters, training information, and/or other information from the home electronics device 12, remote device, and/or other device. One or more of the communication techniques discussed with reference to FIGS. 5A-6C may be used in order to communicate information from the device to the cloud computing system 18. For example, the home electronics device 12 may be connected to the internet (e.g., with a wired connection, wireless connection using WiFi, and/or other connection of network equipment configured to access the internet). Using internet access and/or a cloud computing system client, the device may transmit information and/or otherwise communicate with the cloud computing system 18. For example, a garage door opener may send device status to the cloud computing system 18 (e.g., garage door is open), activation signal parameters corresponding to the garage door opener, device identification information, and/or other information.

In some embodiments, the cloud computing system 18 may receive information from another source running a cloud computing system client. For example, a user may access the cloud computing system 18 (e.g., use a cloud computing system service) and/or otherwise communicate with cloud computing system 18 using a device such as the mobile communications device 16, a personal computer, a vehicle infotainment system, and/or another device running a cloud computing system client. The user may provide information to the cloud computing system 18 using such a device. For example, a user may provide activation signal parameters, training information, and/or other information from the trainable transceiver 10. This may include actions such as a user entering information in a web browser. For example, a user may select from a list of devices presented by the cloud computing system platform and the cloud computing system 18 may use the received information to determine and/or retrieve from a database activation signal parameters, training information, and/or other information corresponding to the user selected device.

Still referring to FIG. 8A, a trainable transceiver may obtain information (e.g., activation signal parameters, training information, and/or other information related to a home electronics device 12, remote device and/or other device) from the cloud computing system 18 in a copy mode in one embodiment. One or more of the communication techniques described herein may be used. The copy mode may allow a second trainable transceiver 110 to copy information provided by and/or used by the first trainable transceiver 10. In one embodiment, all the information from the first trainable transceiver 10 is copied to the second trainable transceiver 110 such that the second trainable transceiver 110 includes all the information of the first trainable transceiver 10. The second trainable transceiver 110 may use the received information in addition to information already stored on the second trainable transceiver 110. In other words, the second trainable transceiver 110 may control all of the device the first trainable transceiver 10 is configured to control using the information received from the cloud computing system 18, and in addition, the second trainable transceiver 110 may control further devices using information already stored on the second trainable transceiver 110. Alternatively, the second trainable transceiver 110 may be a direct copy of the first trainable transceiver 10 following the reception of information from the cloud computing system 18 while in copy mode. In other words, the second trainable transceiver 110 may be configured to control the same devices as the first trainable transceiver 10 after receiving information from the cloud computing system 18 in copy mode. In one embodiment, copy mode includes first erasing data from the second transceiver 110 and then receiving information from the cloud computing system 18 such that the second trainable transceiver 110 is copy of the first trainable transceiver 10 (e.g., configured to control the same devices). In other embodiments, the second trainable transceiver 110 may not be configured to control any devices prior to receiving the information from the cloud computing system 18 such that after receiving the information from the cloud computing system 18, the second trainable transceiver 110 is configured to control the same devices as the first trainable transceiver 10.

In further embodiments, copy mode allows for part of the information (e.g., activation signal parameters, training information, and/or other information related to the home electronics device 12, remote device and/or other device) provided by the first trainable transceiver 10 to be received by the second trainable transceiver 110 from the cloud computing system 18. For example, information from the first trainable transceiver 10 corresponding to a subset of device(s) of a plurality of devices the first trainable transceiver 10 is trained to control may be transmitted to the second trainable transceiver 110. The subset may include information corresponding to particular devices that are selected by a user for which information is to be copied to the second transceiver 110.

Figure 8B:
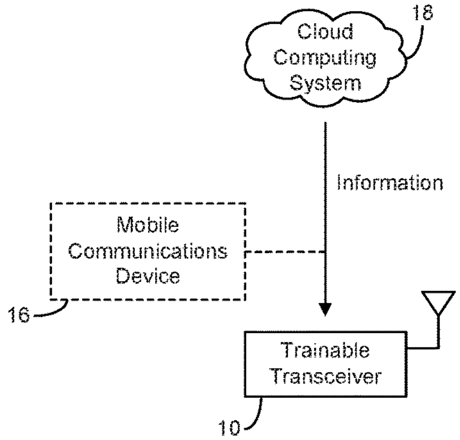
FIG. 8B illustrates an exemplary embodiment of a trainable transceiver receiving information from a cloud computing system while in a copy mode.

Referring now to FIG. 8B, an alternative embodiment of a trainable transceiver acquiring information from the cloud computing system 18 in copy mode is illustrated. The trainable transceiver 10 may recall activation signal parameters, training information (e.g., device identification information), and/or other information related to a home electronics device, remote device and/or other device from the cloud computing system. Recalling information may include receiving information stored in the cloud computing system 18 that was originally transmitted to the cloud computing system 18 by that trainable transceiver 10. In other embodiments, recalling information is receiving information from the cloud computing system 18 with the information having been provided to the cloud computing system 18 using any of the techniques described herein. The information recalled from the cloud computing system 18 (e.g., received by the trainable transceiver 10 from the cloud computing system 18) may include manufacturer information but not include a key for a particular home electronics device, remote device, and/or other device. The key may be encryption information (e.g., a rolling code, seed, code, or other encryption information) used in communicating with a home electronics device, remote device, and/or other device. For example, the trainable transceiver may receive activation signal parameters (e.g., transmission frequency), training information (e.g., device identification information such as make, model, and serial number), and/or other information from the cloud computing system 18 but not receive a key from the cloud computing system 18. The manufacturer data received from the cloud computing system 18 may allow the trainable transceiver 10 to communicate with a corresponding device but not allow the trainable transceiver 10 to send the device an activation signal (e.g., because the trainable transceiver 10 does not have the key). Using the manufacturer data and/or other information, the trainable transceiver 10 may be further trained to control the device. This may result in the trainable transceiver 10 receiving the key from the device. For example, the trainable transceiver 10 may need to be further trained using additional training steps to control a device using a rolling code. In other embodiments where the device uses a rolling code (e.g., garage door opener using a rolling code), a user may need to cause the device to learn the trainable transceiver 10. For example, the user may be instructed (e.g., by the trainable transceiver 10 through a display) to place the device into a learning mode, according to the instructions associated with the device, and then send an activation signal from the trainable transceiver 10. This may allow the trainable transceiver 10 to further control the device using a rolling code.

In alternative embodiments, the trainable transceiver receiving information from the cloud computing system may be configured such that the trainable transceiver 10 is able to control the device upon receiving the information and/or further configuration. The further configuration may take place without additional user input (e.g., automatically in response to receiving the information). For example, the information received from the cloud computing system 18 may include all of the activation signal parameters, training information, and/or other information necessary to control one or more devices using activation signals. The trainable transceiver 10, upon receiving the information from the cloud computing system 18, may be able to control a device associated with the information by sending an activation signal formatted based on the received information.

Referring generally to FIGS. 8A-8B, the transfer of information between devices and the cloud computing system 18 and/or the cloud computing system 18 and devices may be initiated, controlled by, or otherwise include additional devices. For example, the mobile communications device 16 may facilitate communication between the cloud computing system 18 and a device as previously discussed with reference to FIGS. 6A-6B. This is illustrated in the figures with the mobile communications device 16 pictured with a dashed line. Similarly, other hardware such as a vehicle transceiver may facilitate communication between the cloud computing system 18 and the trainable transceiver 10 or 110 (e.g., as described with reference to FIG. 6C).

In some embodiments, copy mode, recall of information, and/or other transfer of information between the trainable transceiver 10 and the cloud computing system 18 is controlled by a trainable transceiver. Control of these functions may be performed using hardware and/or software local to the trainable transceiver 10 and may include using a cloud computing system client and/or platform (e.g., an application client running on the trainable transceiver). For example, a user may provide an input on the trainable transceiver 10 causing the trainable transceiver 10 to transmit information to the cloud computing system 18. Similarly, a user may provide an input on the same trainable transceiver 10 or the second trainable transceiver 110 to receive information from the cloud computing system 18 (e.g., send a request signal to the cloud computing system 18 resulting in the reception of information). In some embodiments, the mode of the trainable transceiver 10, the type of copy mode to be used when transferring information, devices for which information is to be transferred, and/or other settings or options related to transferring information to or from the cloud computing system 18 are set using inputs received by the trainable transceiver 10. For example, a user may provide an input to request information from the cloud computing system 18. The cloud computing system 18 may provide a list of devices for which information may be received. This list may be displayed to a user by the trainable transceiver 10. The user may then select the devices for which information is desired (e.g., which devices the user wants the trainable transceiver 10 trained to control). The trainable transceiver 10 may send a request transmission based on this selection to the cloud computing system 18 which transmits information in response to the request transmission. In further embodiments, the transfer of information is not based on a user input. For example, the cloud computing system 18 may automatically transmit information upon the occurrence of an event (e.g., the trainable transceiver 10 establishes communication with the cloud computing system 18), periodically (e.g., daily at a particular time), and/or otherwise transmit information without first receiving a user input. Similarly, the trainable transceiver 10 may automatically transmit information to the cloud computing system 18.

In the above discussion, embodiments were discussed in which the trainable transceiver 10 is used to control copy mode, recall of information, and/or other transfer of information between the cloud computing system 18 and another device. In some embodiments, other devices perform the above described control functions. For example, the mobile communications device 16 may perform control functions. A user may provide inputs to the mobile communications device 16 for controlling the transmission of data. The mobile communications device 16 may forward the inputs to the trainable transceiver 10 which then implement the control functions as described above. Alternatively, the mobile communications device 16 may include a cloud computing system client (e.g., mobile application) which handles user input and transmits user input to the cloud computing system 18 for controlling the transmission of data. In further embodiments, a personal computer and/or other device having a cloud computing system client may control the transmission of data in the above described manner. For example, a user may provide an input to a cloud computing system client on personal computer which causes the information from the trainable transceiver 10 to be transmitted to the cloud computing system 18 and causes the cloud computing system 18 to transmit the information to the second trainable transceiver 110. The user, through the cloud computing system client, may control such parameters as which trainable transceiver transmits the information, which trainable transceiver receives the information, to which device the information relates, and/or otherwise control the transfer of information using the cloud computing system 18.

Figure 9:
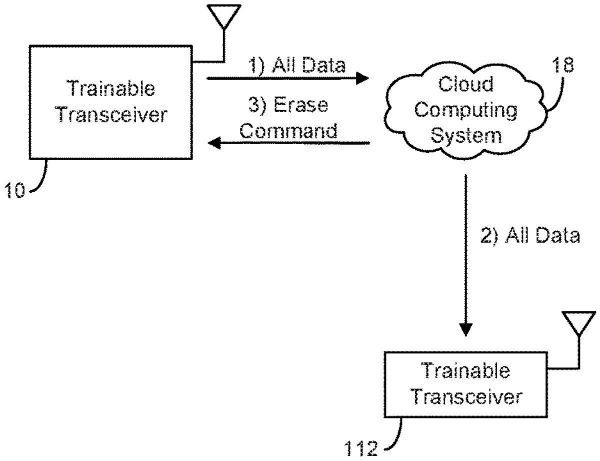
FIG. 9 illustrates an exemplary embodiment of a trainable transceiver receiving information from a cloud computing system according to a transfer mode.

Referring now to FIG. 9, a trainable transceiver may recall information from a cloud computing system while in a transfer mode. Recalling information in a transfer mode may include receiving all the information corresponding to a second trainable transceiver 112 such that the trainable transceiver 112 receiving the information becomes a clone of the original trainable transceiver 10 (e.g., transceiver that is the source of the information). For example, a user may provide an input to the trainable transceiver 112, the cloud computing system 18 (e.g., via a cloud computing system client), and/or other device such that the trainable transceiver 112 enters transfer mode. This may result in the trainable transceiver 112 sending an information request to the cloud computing system 18. The cloud computing system 18 may then request all the data from the original trainable transceiver 10. The trainable transceiver 10 may transmit all the data to the cloud computing system 18. The cloud computing system 18 may then transmit this data to the second trainable transceiver 112 in transfer mode. The cloud computing system 18 may then send a command to the first trainable transceiver 10 causing the first trainable transceiver 10 to be erased. Alternative orders of the above described steps are possible. For example, the first trainable transceiver 10 may transmit the data to the cloud computing system 18, the cloud computing system 18 may then transmit an erase command to the trainable transceiver 10, and then the cloud computing system 18 may transmit the information to the second trainable transceiver 112 in transfer mode.

In some embodiments, all the data of a trainable transceiver is transferred to a second trainable transceiver using the transfer mode. For example, the data transferred may include a key (e.g., rolling code, seed, and/or other encryption information) for a device the first trainable transceiver 10 is trained to control. Transferring all the data may include copying the entire local memory of the first transceiver 10 and causing the local memory of the second trainable transceiver 112 to be written with the copied information. In other embodiments, only the information used to control the devices associated with the first transceiver 10 is transferred to the second transceiver 112. For example, the first transceiver 112 may transmit to the cloud computing system 18 all of the information used to format control signals for the devices the first trainable transceiver 10 is trained to control. The cloud computing system 18 may then transmit this information to the second trainable transceiver 112 (e.g., the transceiver in transfer mode). The second transceiver 112 may then use this information for formatting control signals to control the same devices. The first trainable transceiver 10 may then be erased.

Advantageously, transfer mode allows a user to copy the trainable transceiver 10 such that the second trainable transceiver 112 may control the same devices. Furthermore, erasing the first transceiver 10 may provide an advantage in that it prevents contention between two trainable transceivers because the cloud computing system 18 erases the channel of the first trainable transceiver 10.

Generally, other communication techniques and/or devices described herein may be used to transfer information from the first trainable transceiver 10 to the second trainable transceiver 112. Information may include activation signal parameters, training information, and/or other information related to a home electronics device, remote device, trainable transceiver, and/or other device. In one embodiment, the first trainable transceiver 10 may transfer the information to the second trainable transceiver 112 directly using one or more of the communication techniques described herein. For example, the two trainable transceivers may be in communication using BLE transceivers and a Bluetooth protocol. In other embodiments, information may be transferred between the first trainable transceiver 10 and the second trainable transceiver 112 using a mobile communications device. For example, the first trainable transceiver 10 may communicate the information to a mobile communications device using a technique described herein (e.g., Bluetooth based communications. The information may be stored locally in memory included in the mobile communications device. The mobile communications device may then transmit the information to the second trainable transceiver 112 using one or more of the communications techniques described herein (e.g., using Bluetooth). In further embodiments, the cloud computing system 18 may be implemented as a local cloud computing system using a mobile communications device as the hardware to implement the local cloud computing system. Information may be stored on the mobile communications device and transmitted and/or received (e.g., to or from a trainable transceiver) using Bluetooth and/or another communication technique described herein.

One or more security features may be used in conjunction with the transfer of information from the first trainable transceiver 10 to the second trainable transceiver 112. In one embodiment, a time limit is placed on the transfer of information such that the transfer must be initiated within the time limit or information will not be transferred. This technique may be used in embodiments where information may be transferred using a mobile communications device. For example, an application on a mobile communications device may be used to receive the information from the first trainable transceiver 10. The application may automatically erase the information from memory included in the mobile communication device upon the expiration of a set time period from when the information was received. For example, the time period may be ten minutes. The application may communicate this time limit to a user (e.g., display a prompt on the display of the mobile communications device such as "you have 10 minutes to transfer to the next vehicle"). If the transfer to the second trainable transceiver 112 is initiated within the set time period, the information may be transferred to the second trainable transceiver 112. Once the transfer is complete, the mobile communications device (e.g., using the application) may erase the information from memory.

In some embodiments, a biometric authentication may be required to transfer information from the first trainable transceiver 10 to the second trainable transceiver 112 using a mobile communications device. For example, an application on the mobile communications device may require the user to have his or her fingerprint scanned by a fingerprint reader or other device included in the mobile communications device. The biometric authentication input may be required prior to the mobile communications device receiving the information from the first trainable transceiver 10. Alternatively or additionally, the biometric authentication input may be required prior to the mobile communications device transferring the information to the second trainable transceiver 112. Other biometric authentication inputs may be used in place of or in conjunction with fingerprints. For example, biometric inputs may include an image of the user's face (e.g., for facial recognition), palm print, DNA, image of the user's eye (e.g., for iris recognition), etc. In other embodiments, a password may be used instead. The biometric authentication input and/or password may be compared (e.g., using a control circuit and/or algorithm) to a corresponding reference stored in memory of the mobile communications device. The application running on the mobile communications device may require a user to input a biometric and/or password reference upon setup of the application, pairing with a trainable transceiver, and/or at other points in time or in response to other triggers. In other embodiments, the reference may be stored in and/or compared with one or more of a trainable transceiver, the cloud computing system 18, and/or other hardware and software. Advantageously, one or more of the security features described herein may help to keep information related to home electronics devices, remote devices, and/or other devices secure. This may prevent unauthorized and/or unintended users from controlling a device using an activation signal.

Figure 10A:
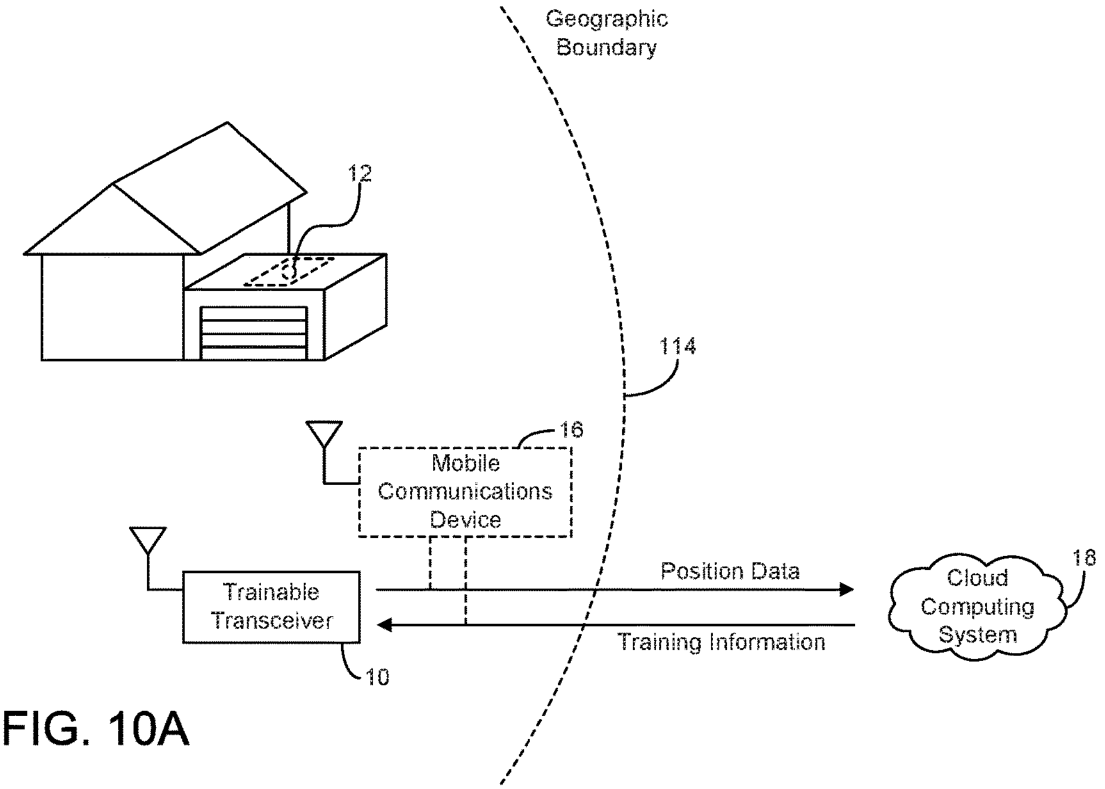
FIG. 10A illustrates an exemplary embodiment of a trainable transceiver system in which training information is transmitted to a trainable transceiver based on the location or position of the trainable transceiver.

Referring now to FIG. 10A, the position of the trainable transceiver 10 relative to the home electronics device 12, remote device, and/or other device may be used as a security feature when training the trainable transceiver 10 with information transmitted from the cloud computing system 18. Location information from the cloud computing system 18 may be used to prevent the training of the trainable transceiver 10 unless the location of the trainable transceiver 10 is determined to be within a certain distance of the device 12 to which the trainable transceiver 10 is being trained. In some embodiments, the street address or other location information corresponding to a home in which the device is located may be used instead of the location of the device 12 itself (e.g., the cloud computing system 18 may use the street address to determine GPS coordinates for the home). Position information for the device 12 may be provided to the cloud computing system 18 by a user (e.g., a user may input the address of his or her home using a cloud computing system client). Alternatively, the device 12 may communicate its position to the cloud computing system 18 using one or more of the communication techniques described herein.

When the trainable transceiver 10 receives a request to enter a training mode, be trained to control the device 12, access activation signal parameters and/or training information from another source (e.g., mobile communications device 16 or cloud computing system 18), and/or otherwise be trained, the trainable transceiver 10 may communicate position data indicating its current position to the cloud computing system 18. The trainable transceiver 10 may obtain position data corresponding to its current position using an integrated GPS receiver, GPS receiver of a vehicle to which the trainable transceiver 10 is coupled, dead reckoning data provided by a vehicle to which the trainable transceiver 10 is coupled, GPS position information received from the mobile communications device 16 in communication with the trainable transceiver 10, and/or another source of position or location information.

The trainable transceiver 10 may then transmit the position and/or location information to the cloud computing system 18 using one or more of the communications techniques described herein. The position information (e.g., GPS coordinates or other position data) may be transmitted to the cloud computing system 18 alone, with or in conjunction with a request for information (e.g., activation signal parameters for one or more devices), before a request for information, after a request for information, and/or at other times with or without other information. Alternatively, the trainable transceiver 10 may request information from the cloud computing system 18, the cloud computing system 18 may send a request for position information to the trainable transceiver 10, and the trainable transceiver 10 may then transmit position information to the cloud computing system 18. In one embodiment, the cloud computing system 18 compares the current position of the trainable transceiver 10 to the location and/or position of the devices 12 for which the trainable transceiver 10 has requested related information (e.g., activation signal parameters for the devices). If the cloud computing system 18 determines that the current position of the trainable transceiver 10 is further than a set distance (e.g., one mile) from the device 12, the cloud computing system 18 may not send the requested information to the trainable transceiver 10. The cloud computing system 18 may transmit information and/or instructions to the trainable transceiver 10 causing the trainable transceiver 10 to notify the user (e.g., by displaying message on a display) that the trainable transceiver 10 cannot be trained because it is too far away from the device 12. If the cloud computing system 18 determines that the current position of the trainable transceiver 10 is less than a set distance away from the device 12, the cloud computing system 18 may send the requested information to the trainable transceiver 10. Thus, the cloud computing system 18 may use position information in order to control access to information (e.g., activation signal parameters, training information, and/or other information related to the home electronics device 12 and/or remote device) based on a geographic boundary 114 in relation to the device 12. As explained herein, the geographic boundary 114 may be in relation to a home associated with one or more devices in alternative embodiments.

In alternative embodiments, the trainable transceiver 10 determines the location of devices 12 and/or a home from information received from the cloud computing system 18 prior to sending a request for information to the cloud computing system 18. For example, when the trainable transceiver 10 receives an input related to training the trainable transceiver 10 to the device 12, the trainable transceiver 10 may request position information from the cloud computing system 18 related to the device 12 and/or a home location using one or more of the communication techniques described herein. The cloud computing system 18 may transmit the position information in response to the request. The trainable transceiver 10 may then controls access to information stored on the cloud computing system by preventing the transmission of a request for information if the current position of the trainable transceiver is outside a geographic boundary in relation to the device and/or home. If the trainable transceiver 10 determines that it is within the geographic boundary 114 (e.g., less than one mile from the device), the trainable transceiver 10 may send the request for information to the cloud computing system 18. The cloud computing system 18 may transmit the requested information to the trainable transceiver 10 in response.

In an alternative embodiment, the trainable transceiver 10 may receive position information from the cloud computing system 18 for the position of the user's home when an input has been received to train the trainable transceiver 10. The trainable transceiver 10 may compare the current location of the trainable transceiver 10 to the position of the user's home. If the trainable transceiver 10 determines that the trainable transceiver 10 is outside of the geography boundary 114 (e.g., one mile from the user's home) based on the position of the user's home, the trainable transceiver 10 may prevent itself from being trained. For example, the trainable transceiver 10 may automatically exit training mode. Thus, the trainable transceiver 10 may not be trained unless the trainable transceiver 10 is within a certain distance of the user's home.

The above discussed location based security features referenced a single reference location (e.g., a user's home). In other embodiments, multiple reference locations may be used. For example, the cloud may store position and/or location information for a plurality of homes and/or devices for use in determining the relative location of the trainable transceiver 10. In some embodiments, position information may be used for other functions of the trainable transceiver 10. For example, the trainable transceiver 10 may use position information received from the cloud computing system 18 to determine what activation signal parameters to use in formatting an activation signal in response to a user input. The trainable transceiver 10 may format the activation signal using activation signal parameters for the closest device which the trainable transceiver 10 is trained to control. In some embodiments, the trainable transceiver 10 may be trained to control a first set of devices at a first location and a second set of devices at a second location. Using position and/or location information form the cloud computing system 18 corresponding to the first location and the second location (e.g., first position data and second position data), the trainable transceiver 10 may determine which set of devices to control based on user inputs (e.g., a first button press to control a first device of a set, a second button press to control a second device of the same set, etc.). for example, the trainable transceiver 10 may send a control signal for a device of which ever set the trainable transceiver 10 is closest to. Alternatively, a user may set geographic boundaries in which the trainable transceiver 10 controls the corresponding set of devices. In alternative embodiments, the determination is made by the cloud computing system 18 with the cloud computing system 18 in turn sending instructions to the trainable transceiver 10 causing the trainable transceiver 10 to send an activation signal corresponding to a particular device.

Figure 10B:
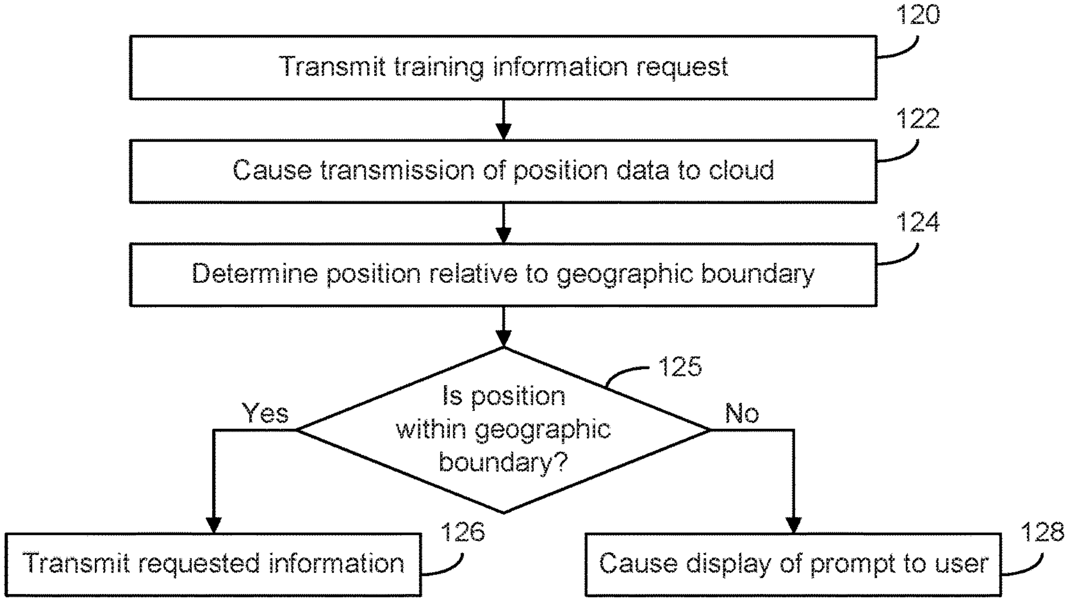
FIG. 10B illustrates a flow chart of the steps from transmitting information to a trainable transceiver based on the location or position of the trainable transceiver according to an exemplary embodiment.

Referring now to FIG. 10B, a flow chart illustrates the steps for controlling access to information stored on the cloud computing system 18 using the position of a trainable transceiver 10 according to an exemplary embodiment. The trainable transceiver 10 may transmit a training request to the cloud computing system (step 120). One or more of the communication techniques described herein may be used. For example, the trainable transceiver 10 may transmit information to the cloud computing system 18 using a mobile communications device 16 in communication with the trainable transceiver 10, where the mobile communications device 16 is running a cloud computing system client. The training information request may be for information such as activation signal parameters, training information, and/or other information related to a home electronics device 12 and/or remote device. In some embodiments, the techniques for securing access to information may be applied to additional information such as notifications, status information, and/or other information stored on and/or transferred using the cloud computing system. The transmission of a training information request may be in response to a user input received by the trainable transceiver (e.g., from an operator input device included in the trainable transceiver and/or other hardware in communication with the trainable transceiver such as a mobile communications device).

The trainable transceiver 10 may then be caused to transmit position data to the cloud computing system 12 related to the current position of the trainable transceiver (step 122). In one embodiment, the trainable transceiver 10 transmits position data related to its current position in response to the user input received. In other embodiments, the trainable transceiver 10 transmits position information in response to a request received from the cloud computing system 18. The trainable transceiver 10 may transmit position information as part of the information request transmitted to the cloud computing system 12.

The cloud computing system 18 may then determine, using the position data received from the trainable transceiver 10, the position of the trainable transceiver 10 relative to the geographic boundary (step 124). The geographic boundary may be expressed as a certain distance (e.g., one mile) from a device to which the training information request is related. Alternatively, the geographic boundary may be based on the position of a home associated with the device and/or trainable transceiver 10. The cloud computing system 18 may then determine, using the position data received from the trainable transceiver 10 corresponding to the current position of the trainable transceiver 10, if the trainable transceiver 10 is inside or outside a geographic boundary (step 125).

If the current position of the trainable transceiver 10 is within the geographic boundary, the cloud computing system may transmit the requested information to the trainable transceiver 10 (step 126). The trainable transceiver 10 may use the requested information in order to train itself to control the device(s) associated with the information. Alternatively, the information requested may be or include instructions which when received by the trainable transceiver 10 are executed by the trainable transceiver 10. The instructions may cause the trainable transceiver 10 to be configured to control the device. If the current position of the trainable transceiver 10 is outside the geographic boundary, the cloud computing system 18 may not transmit the requested information to the trainable transceiver 10 (step 128). In some embodiments, the cloud computing system 18 may transmit information and/or instructions resulting in the trainable transceiver 10 displaying a prompt of notification to the user. Alternatively, the prompt or notification may be or include an audible component (e.g., the trainable transceiver 10 may control a speaker to cause an audible message to be communicated to a user).

Generally, the cloud computing system 18 may be used to store KeeLoq keys in some embodiments. KeeLoq keys may be information which allow communication with a device implementing a KeeLoq encryption protocol (e.g., code hoping). During training, the trainable transceiver 10 may access one or more KeeLoq keys (e.g., hoping code key) using the cloud computing system 18. For example, training the trainable transceiver 10 may include the trainable transceiver 10 sending a request for a key to the cloud computing system 18, with the key corresponding to a particular device. The cloud computing system 18 may receive the request and transmit the key to the trainable transceiver 10 in response. Advantageously, this may allow the trainable transceiver 10 to access KeeLoq keys without unique keys being stored locally on the trainable transceiver 12. This may provide a security advantage as unused keys are not stored locally thus controlling access to keys not currently being used. This may also provide an advantage in that many unique keys would not be stored locally on the trainable transceiver 10 thus reducing the memory needed to store keys.

Referring to FIGS. 11-13B, a user may provide information about a home electronics device, remote device, and/or other device to a trainable transceiver system, and the trainable transceiver system may display training instructions to the user based on this information. This function may be carried out using the cloud computing system 18 and/or an application (e.g., cloud computing system client) running on the device used by the user to provide the information about the device the user is training the trainable transceiver 10 to control. Alternatively, this function may be carried out by an application running locally on the device and without accessing the cloud computing system 18 (e.g., the application is a program stored in local device memory and executed using local device computing hardware and resources).

Figure 11:
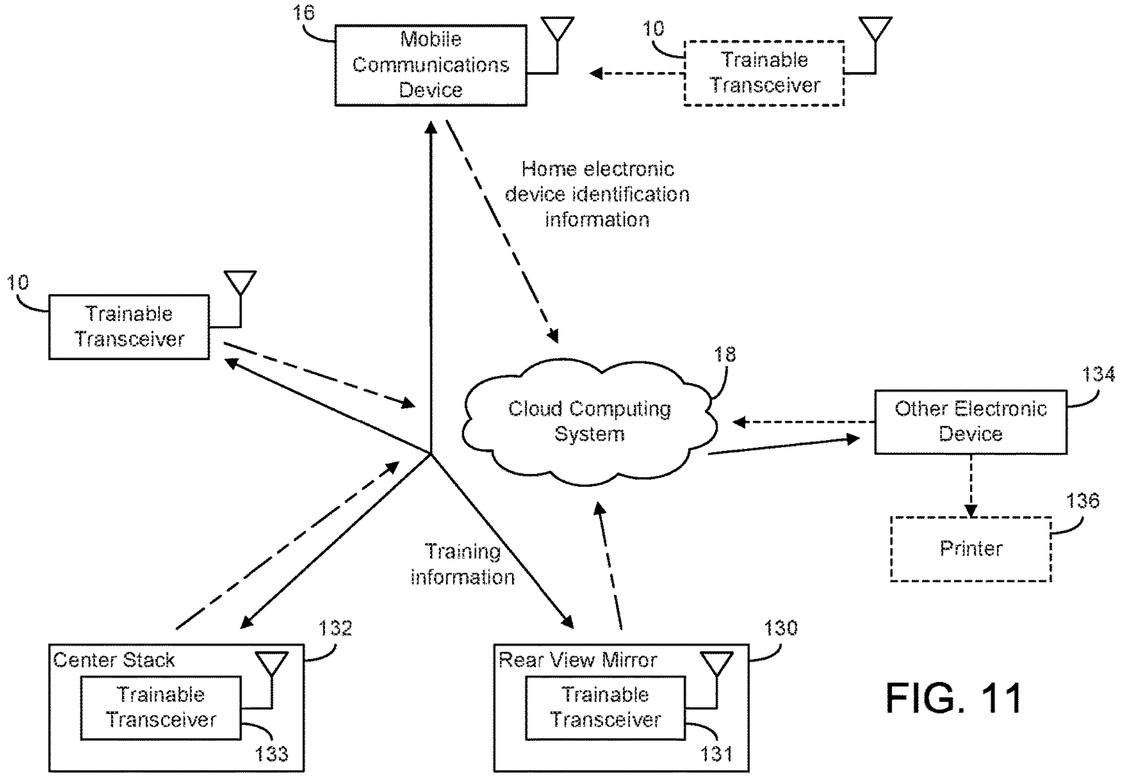
FIG. 11 illustrates an exemplary embodiment of a device providing a cloud computing system with device identification information and receiving training information from the cloud computing system corresponding to the device identification information.

Referring now to FIG. 11, a variety of devices may be used to receive the user input and/or display the training instructions. For example, user input, including information about the device for which the trainable transceiver is to be trained, may be received by the mobile communications device 16. The mobile communications device 16 may be running a cloud client such as an application. Using the application and an input mechanism (e.g., voice commands, touchscreen input, etc.), the user may provide information about the device for which training information is sought. The trainable transceiver 10 may receive the user input. For example, the trainable transceiver 10 may receive user input via an operator input device. In some embodiments, the trainable transceiver 10 may include a cloud computing system client which is used in conjunction with the operator input device (e.g., buttons, a touch screen, etc.) to receive input from a user. In some embodiments, the trainable transceiver 10 may be in communication with the mobile communications device 16, a rear view mirror 130 of a vehicle, a center stack 132 of a vehicle (e.g., infotainment system) and/or other hardware. The device(s) in communication with the trainable transceiver 10 may be used to receive user input (e.g., including information about the device for which the trainable transceiver 10 is to be trained). For example, a user may enter information about the device using a touchscreen forming part of an infotainment system. The rear view mirror 130 may include an operator input device such as a series of buttons or touchscreen for receiving user input. In some embodiments, other electronic devices 134 may be used to receive information (e.g., including information about the device for which the trainable transceiver 10 is to be trained) from a user. For example, a user may enter information about the device using a personal computer (e.g., a desktop located in the user's home).

In some embodiments, information about the device for which the trainable transceiver 10 is to be trained may include information such as activation signal parameters, training information (e.g., device identification information), and/or other information related to a home electronics device and/or remote device. In other embodiments, the information received from the user may be only device identification information such as make, model, serial number, Federal Communications Commission identification number, and/or other information identifying a home electronics device, remote device, and/or other device. In some embodiments, the user may enter this information using an input device and/or a graphical user interface. For example, a user may select from a list of available devices in order to provide identification information such as make and model. A user may enter information in a field or fields, select information using a dropdown menu, and/or otherwise provide the information. In some embodiments, identification information may be, include, or be determined from a machine readable image. For example, a user may scan a quick reference code, barcode, or other machine readable image using a camera, light sensor, and/or other device included in the device the user is using to input information (e.g., the user may scan a machine readable image using a camera included in a mobile communications device and/or the application used for entering information). In some embodiments, the machine readable image is decoded locally in order to access information (e.g., device identification information). In other embodiments, the machine readable image may be transmitted to a remote location for decoding. For example, the device receiving user input (e.g., a trainable transceiver) may transmit the machine readable image to the cloud computing system for decoding. The machine readable image may be decoded using one or more algorithms (e.g., object recognition algorithms, image processing algorithms, etc.). In some embodiments, the information input by the user may be found on a home electronics device, remote device, and/or other device, in a manual associated with the device, on a website of the manufacturer of the device, and/or in other locations.

In some embodiments, the trainable transceiver 10 may determine device identification information for a home electronics device 12, remote device, and/or other device for which the trainable transceiver 10 is being trained to operate. For example, a user may place the trainable transceiver 10 in a training mode (e.g., through a user input). The trainable transceiver 10 may then detect device identification information for a device. In one embodiment, the trainable transceiver 10 may send a transmissions using a variety of transmission parameters (e.g., frequency, channels, etc.) and/or activation signal parameters. If the trainable transceiver 10 receives an acknowledgement transmission from a device, the trainable transceiver 10 may determine device identification information based on the acknowledgement received. For example, the acknowledgement received may include device identification information. Alternatively, the trainable transceiver 10 may use the transmission parameters and/or activation signal parameters of the transmission which triggered the acknowledgement transmission from the device. For example, the trainable transceiver 10 may access a database (e.g., locally and/or on remote hardware/device) which stores device identification information with transmission parameters and/or activation signal parameters. Using the database, the trainable transceiver 10 may retrieve device identification information for use in the functions described herein. Alternatively or additionally, the database may include training information indexed to transmission parameters and/or activation signal parameters. The trainable transceiver 10 may receive training information form the database for use in the functions described herein. In some embodiments, the trainable transceiver 10 transmits the identification information and/or training information to another device. For example, the trainable transceiver 10 may transmit identification information to the mobile communications device 16 which then displays training information using one or more of the techniques described herein.

In one embodiment, the device receiving the user input, including information about the device for which the trainable transceiver 10 is to be trained, may communicate the information to the cloud computing system 18 using one or more of the communication techniques described herein. The device receiving user input may transmit device identification information received from the user to the cloud computing system 18. The device identification information may correspond to a home electronics device, remote device, and/or other device. This is represented by the long-dashed lines in FIG. 11. The cloud computing system 18 may process the identification information to determine or otherwise access training information corresponding to the device. Training information may include step-by-step instructions for training the trainable transceiver 10 to control the device, instructions for placing the device in a learning mode, communication frequencies and/or other activation signal parameters which allow the trainable transceiver 10 to communicate with and/or control the device, and/or other information related to training the trainable transceiver 10 to control the device. For example, the cloud computing system 18 may cross reference received identification information with a database storing identification information for a plurality of devices. Upon determining that the received identification information matches or otherwise corresponds to stored identification information, the cloud computing system 18 may retrieve training information stored in the database which corresponds to the identification information stored in the database. In other embodiments, other techniques may be used to obtain the training information based on the received identification information.

In some embodiments, the device receiving the user input may process the user input locally rather than transmitting the information. The device may process the identification information to determine or otherwise access training information corresponding to the device. Training information may include step-by-step instructions for training the trainable transceiver 10 to control the device, instructions for placing the device in a learning mode, communication frequencies and/or other activation signal parameters which allow the trainable transceiver 10 to communicate with and/or control the device, and/or other information related to training the trainable transceiver 10 to control the device. For example, the device may cross reference received identification information with a database storing identification information for a plurality of devices. Upon determining that the received identification information matches or otherwise corresponds to stored identification information, the device may retrieve training information stored in the database which corresponds to the identification information stored in the database. In some embodiments, additional steps and/or techniques may be included in accessing training information. For example, the device may communicate with a remotely stored database in order to retrieve information.

In embodiments where training information is accessed using a cloud computing system, the cloud computing system may transmit the training information to the device which requested the training information. The device may receive training information (e.g., steps to train) from the cloud computing system 18. One or more of the communication techniques described herein may be used. This is represented by the solid lines in FIG. 11.

In embodiments where the device receiving the user input does not transmit the user input to a remote location, the training information may be read from memory and/or otherwise accessed.

The training information may be displayed on the device that received the input and/or another device (e.g., the device receiving the training information, a device in communication with the device which received the training information, and/or other devices). The trainable transceiver 10 may display the training information on a display included in the trainable transceiver 10. The mobile communications device 16 may display the training information on a display included in the mobile communications device 16. In some embodiments, the mobile communications device 16 may receive the training information from another device. For example, the mobile communications device 16 may receive the training information from the trainable transceiver 10 which is in communication with the mobile communications device 16. In further embodiments, the mobile communications device 16 may transmit training information to the trainable transceiver 10, rear view mirror 130, and/or the vehicle center stack 132 (e.g., vehicle infotainment system) for display. For example, the mobile communications device 16 may communicate training information to one or more of the proceeding using Bluetooth. In some embodiments, a trainable transceiver 131 included in or otherwise in communication with the rear view mirror 130 may display the training information on a display included in the rear view mirror 130. In other embodiments, a trainable transceiver 133 included in or otherwise in communication with the vehicle center stack 132 (e.g., infotainment system) may display the training information on a display included in the center stack 132 of the vehicle. A personal computer of other electronic device 134 may display the training information on a display included therein. In some embodiments (e.g., where the other electronic device 134 is a personal computer), the other electronic device 134 may be coupled with or otherwise in communication with a printer 136. The other electronic device 134 may print the training information. Advantageously, this may allow a user to take training information with himself or herself to the trainable transceiver 10 and/or device for which the trainable transceiver 10 is being trained. This may provide an advantage in that the user will have the instructions at the location where the trainable transceiver 10 is being trained. In further embodiments, training information may be provided to the user by one or more of the above devices using a speaker. The training information may include audible instructions produced by a speaker of the device having the training information.

Referring now to FIG. 12A, the trainable transceiver 131 may be coupled to and/or integrated with the rear view mirror 130 of a vehicle in some embodiments. This may allow the trainable transceiver 131 to control a display 140 included in the rear view mirror 130, speaker, 142 and/or other output device included in the rear view mirror 130. Additionally, this may allow the trainable transceiver 10 to receive inputs via one or more operator input devices 143 or other input devices included in the rear view mirror 130. In some embodiments, the rear view mirror 130 may include a power source 144, memory 146, control circuit 148, and/or other hardware. These components may be used to provide and/or control functions of the rear view mirror 130. For example, the rear view mirror 130 may automatically dim in response to detected headlights, display vehicle information on a display (e.g., heading, warnings, and/or other information related to the rear view mirror 130 and/or vehicle. These components may also handle user input.

The trainable transceiver 131 may include a rear view mirror interface 150. The rear view mirror interface 150 may allow for communication between the trainable transceiver 10 and the control circuit 148 of the rear view mirror 130. In one embodiment, the rear view mirror interface 150 includes physical connection such as ports, connectors, wiring, and/or other hardware used to create an electrical connection between a control circuit 152 of the trainable transceiver 131 and the control circuit 148 of the rear view mirror 130. In alternative embodiments, the control circuit 152 of the trainable transceiver 131 and the control circuit 148 of the rear view mirror 130 are directly connected (e.g., wired such that outputs from one control circuit are received as inputs at the other control circuit and/or vice versa). In further embodiments, the rear view mirror interface 150 may include and/or be implemented by computer programing, code, instructions, or other software stored in memory 154 in the trainable transceiver 131 and/or rear view mirror 130. Advantageously, the connection between the trainable transceiver 131 and the rear view mirror 130 may allow for components of the rear view mirror 130 to serve two or more functions thus increasing the usefulness of these components, reducing cost, and/or eliminating the need for duplicate components to provide additional functions to the trainable transceiver 131. For example, the display 140 of the rear view mirror 130 may be used to communicate information relevant to the operation of the rear view mirror 130 (e.g., weather information, if the mirror is set to automatically dim, vehicle warnings, etc.) and information relevant to the trainable transceiver 131 (e.g., training steps, pairing information, whether an activation signal has been received, status information regarding a home electronics device, mobile communications device, and/or remote device, and/or other information related to the trainable transceiver 131).

The connection between the trainable transceiver 131 and the rear view mirror hardware may allow the trainable transceiver 131 to control the hardware included in the rear view mirror 130, send control signals and/or instructions to the control circuit 148 of the rear view mirror 130, receive images and/or image data from the camera(s) included in the rear view mirror (e.g., via the control circuit 148 of the rear view mirror 130), receive control signals and/or instructions, receive sensor information from sensors included in the rear view mirror 130 (e.g., via the control circuit 148 of the rear view mirror), and/or otherwise interact with the rear view mirror 130 and/or components thereof.

The trainable transceiver 131 may be configured to control, communicate, or otherwise operate in conjunction with the control circuit 148 of the rear view mirror 130 to facilitate and/or perform the functions described herein. In one embodiment, the trainable transceiver 131 communicates with the control circuit 148 of the rear view mirror 130 through the rear view mirror interface 150. In other embodiments, the trainable transceiver 131 communicates with the control circuit 148 of the rear view mirror 130 directly (e.g., the control circuit 152 of the trainable transceiver 131 communicates with the control circuit 148 of the rear view mirror 130). The trainable transceiver 131 may communicate and/or control the control circuit 148 of the rear view mirror 130 using a variety of techniques. For example, the trainable transceiver 131 may communicate with the rear view mirror 130 through outputs from the trainable transceivers received as inputs at the control circuit 148 of the rear view mirror 130, sending the rear view mirror 130 a location in memory 146 which contains information instructions, data, or other information which is read by the control circuit 148 of the rear view mirror 130, sending the control circuit 148 of the rear view mirror 130 data, instructions, or other information through a bus, port, or other connection, or otherwise providing instructions, data, or information to the control circuit 148 of the rear view mirror 130.

In some embodiments, the control circuit 148 of the rear view mirror 130 communicates with the control circuit 152 of the trainable transceiver 131 using the same or similar techniques. In other embodiments, the communication is one way with the trainable transceiver 131 sending instructions, data, or other information to the control circuit 148 of the rear view mirror 130. The trainable transceiver 131 may extract data, instructions, or other information from the control circuit 148 of the rear view mirror 130 by reading the memory 146 of the rear view mirror 130 and/or requesting from the control circuit 148 of the rear view mirror 130 an address for a location in memory 146 in which the relevant information can be read. Alternatively, the control circuit 148 of the rear view mirror 130 may send information to the trainable transceiver 131 but only when requested by the trainable transceiver 131.

In one embodiment, the trainable transceiver 131 is configured to provide output to a vehicle occupant using the display 140 and/or speaker 142 of the rear view mirror 130. The trainable transceiver 131 may control the output of the rear view mirror 130 by sending control signals, instructions, information, and/or data to the rear view mirror 130 or otherwise control the display 140 and/or speaker 142 of the rear view mirror 130. In one embodiment, the trainable transceiver 131 controls the output of the rear view mirror 130 using the rear view mirror interface 150. For example, the rear view mirror interface 150 may format instructions, control signals, and/or information such that it can be received and/or processed by the control circuit 148 of the rear view mirror 130. In other embodiments, the control circuit 152 of the trainable transceiver 131 may communicate directly with the control circuit 148 of the rear view mirror 130. The control circuit 148 of the rear view mirror 130 may handle, process, output, forward and/or otherwise manipulate instructions, control signals, data, and/or other information from the trainable transceiver 131. In other embodiments, the control circuit 148 of the rear view mirror 130 forwards, routes, or otherwise directs the instructions, control signals, outputs, data, and/or other information to other components of the rear view mirror 130 without additional processing or manipulation. For example, the trainable transceiver 131 may output a frame buffer to the control circuit 148 of the rear view mirror 130 which then routes the frame buffer to the display 140 without further manipulation. This may include storing the frame buffer in memory included in the control circuit 148 of the rear view mirror 130 and sending an address corresponding to the frame buffer to the display 140. As described in greater detail with respect to later figures, the display 140 may be used by the trainable transceiver 131 to communicate information to a vehicle occupant regarding a home electronics device, remote device, mobile communication device, or other device controlled by and/or in communication with the trainable transceiver 131.

Referring now to FIG. 12B, the trainable transceiver 133 may be coupled to and/or integrated with a center stack 132 (e.g., infotainment system) of a vehicle. The trainable transceiver 133 may include a center stack interface 170 in order to communicate with and/or control the center stack and components therein. The center stack interface 170 may perform functions using the techniques described above with reference to the rear view mirror interface 150 and FIG. 12A. The trainable transceiver 133, using one or more control circuits 172, memory 174, and/or the center stack interface 170, may control the output of the center stack 132 and/or receive inputs from the center stack 132. For example, the trainable transceiver 133 may cause training information to be displayed on a display 160 of the center stack 132 and/or cause an audible output from a speaker 162 included in the center stack 132. The trainable transceiver 133 may receive inputs from one or more operator input devices 163 included in or associated with the center stack.

Figure 13A:
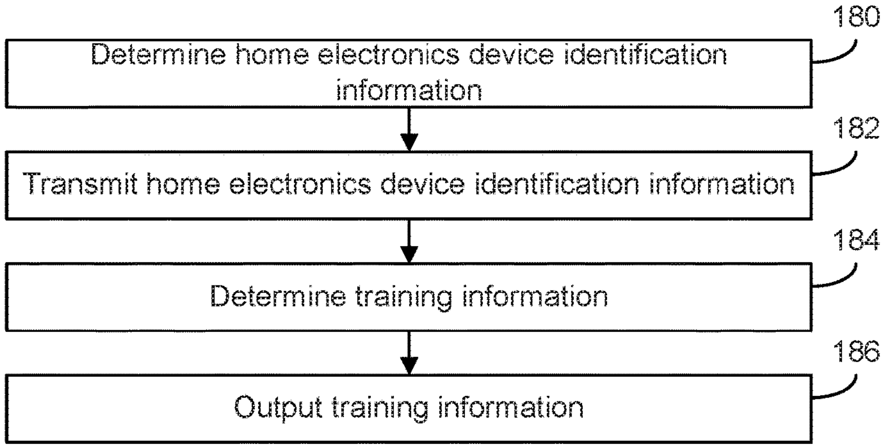
FIG. 13A illustrates a flow chart of an exemplary embodiment of outputting training information to a user based on device identification information.

Referring now to FIG. 13A, a flow chart illustrates an exemplary embodiment of providing a user with training information in response to device identification information. A trainable transceiver 10 may determine home electronics device 12, remote device, and/or other device identification information (step 180). This may include receiving the identification information from a user via a user input device, receiving identification information from another source (e.g., a mobile communications device 16), and/or otherwise receiving device identification information. In some embodiments, determining device identification information may include performing one or more analysis and/or processing steps. For example, a trainable transceiver 10 may determine device identification information by decoding a machine readable image containing device identification information. Devices other than a trainable transceiver 10 (e.g., a mobile communications device 16, rear view mirror, center stack, personal computer, or other electronic device) may determine device identification information.

The device identification information may then be transmitted (step 182). The device identification information may be transmitted to the cloud computing system 18 and/or another device. For example, a trainable transceiver 10 may transmit device identification information received from a user to a cloud computing system 18. In other embodiments, the device identification information is not transmitted but remains stored locally on the device which received the device identification information (e.g., received from a user input).

Training information may then be determined based on the identification information (step 184). In one embodiment, the cloud computing system 18 determines training information based on the device identification information it received from the trainable transceiver 10 or other device. This may include comparing the received device identification information to a database containing device identification information and associated training information. The cloud computing system 18 may transmit the training information to the device which transmitted the device identification information to the cloud computing system 18 and/or another device. In other embodiments, training information may be determined by the device which received the user input providing device identification information or otherwise received device identification information. For example, the device may include a database of device identification information and corresponding training information. This database may be used to find training information corresponding to the device identification information the device received (e.g., received as user input).

The training information that is determined may be output to a user (step 186). Outputting training information may include displaying training information on a display and/or providing training information in audible form using a speaker. For example, a step or instruction for training a device may be displayed as text on a display and/or provided audibly to a user via a speaker (e.g., the speaker may produce an audible message such as "hold the learn button on the garage door opener to place the garage door opener into learn mode"). Continuing the example, training information may be output using hardware of a rear view mirror in communication with a trainable transceiver 10 (e.g., the trainable transceiver with which the user provided identification information).

Figure 13B:
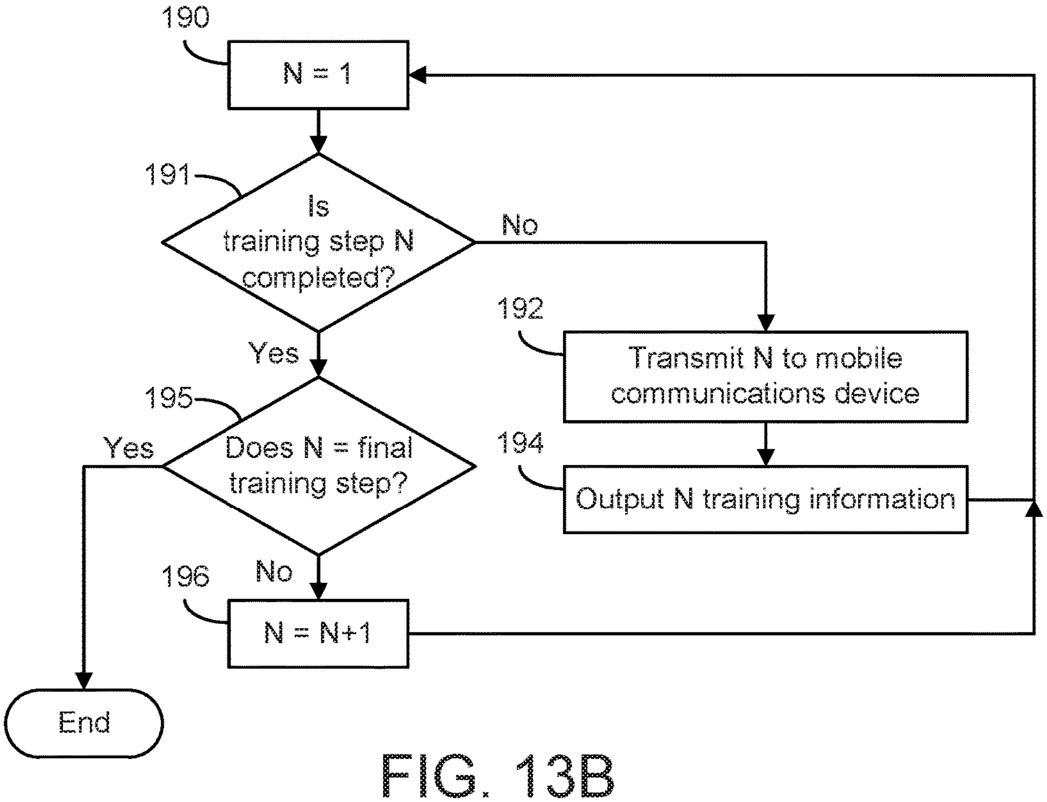
FIG. 13B illustrates a flow chart of an exemplary embodiment of a trainable transceiver providing information about a training process to a device displaying step-by-step training instructions (e.g., training information) to a user.

Referring now to FIG. 13B, a flow chart illustrates an exemplary embodiment of a trainable transceiver 10 providing information about a training process to a device providing step-by-step training instructions (e.g., training information) to a user. A trainable transceiver 10 may communicate to a mobile communications device information about which step in the training process is being performed and/or which steps have successfully been performed. Upon the successful performance of a step in the training process, the mobile communications device 16 may provide the next step of the process to the user. Providing a step may include displaying and/or providing an audible output of training information corresponding to one step of a multi-step training process. The training information may have been acquired according to the techniques described with reference to FIGS. 11-13B and may be provided using one or more of the techniques described therein.

Upon entering a training mode, a trainable transceiver 10 may set a counter value and/or otherwise designate the start of a multi-step training process (step 190). For example, a counter N may be set to a value of 1. Where the training step provided to the user by the mobile communications device 16 is the first step of the training process. The trainable transceiver 10 may determine if the training step corresponding to the counter value N has been completed (step 191). For example, the trainable transceiver 10 may check memory for a flag which is set by the trainable transceiver 10 upon completion of training step. The trainable transceiver 10 may make the determination based on device status communicated to the trainable transceiver 10 by a home electronics device 12, remote device, and/or other device. In further embodiments, diagnostic information may be used in the determination. Other and/or additional techniques may be used to determine if the step has been completed.

If the trainable transceiver 10 determines that the step corresponding to the counter value N has not been completed, the trainable transceiver 10 may transmit training information corresponding to the N step to the mobile communications device 16 (step 192). The transmission may include an instruction for displaying the step which when received and executed causes the mobile communications device 16 to provide the step (e.g., using a display and/or speaker) to a user. In alternative embodiments, the mobile communications device 16 may have the relevant training information stored in memory. In such a case, the trainable transceiver 10 may transmit an indication to the mobile communications device 16 that the step has not been completed which the mobile communications device 16 may use to provide the N step information to the user.

The mobile communications device 16 may then receive the transmission and provide the training information corresponding to the N step of the training process to the user (e.g., output the training information) (step 194). As previously discussed, this may include displaying an instruction to the user and/or playing an audio instruction to the user. After the transmission to the mobile communications device 16 (and after the mobile communications device 16 provides the training information to the user), the counter remains at the same value and the trainable transceiver 10 again determines if the training step for the current counter value is completed (e.g., the loop continues).

If the trainable transceiver 10 determines that the training step for the counter value has been completed, the trainable transceiver determines if the counter value N is equal to the final step of the training process (step 195). In other words, the trainable transceiver 10 determines if the completed step was the last step of the training process. If the completed step was the last step, the trainable transceiver 10 ends the process of providing information about a training process to a device providing step-by-step training instructions (e.g., training information) to a user. The trainable transceiver 10 may transmit an instruction and/or information to the mobile communications device 16 causing the mobile communications device to prompt the user that training has been completed. The trainable transceiver 10 may also end the training process.

If the trainable transceiver 10 determines that the completed step is not the final step, the counter is increased by a value of one (step 196) and the trainable transceiver 10 determines if the new N step has been completed.

In some embodiments, devices other than a mobile communications device 16 are used to provide (e.g., output) the training information to a user. For example, a rear view mirror display and/or speaker may be used to provide the information. In some embodiments, the trainable transceiver 10 provides the information to the user. In such a case, the step in which the training information or indicator is transmitted may be omitted. Other steps, logic, and/or techniques may be used to accomplish the above described functions. Advantageously, this system of providing step-by-step instructions and advancing the instructions as they are completed is more informative than a simple indicator light (e.g., a light changing color during the training process). This may provide an advantage by making it easier to train the trainable transceiver 10.

Generally, a user may have an account for managing the functions described herein using the cloud computing system. For example, the account may be tied to a particular user name and password. Alternatively, the account may be tied to an identification (ID) such as a HomeLink ID. The ID may allow for multiple users to be associated with an account. The account may enable cloud computing system storage of information tied to the account. For example, the cloud computing system may store information such as activation signal parameters, training information, status information, notifications, diagnostic information, and/or other information related to home electronics device, remote devices, and/or other devices. The account may be used to keep a listing of all home electronics devices, remote devices, and/or other devices associated with the user(s) of the account. Devices may be added, modified, manages, deleted, and/or otherwise manipulated by a user via a cloud computing system client. Changes may be reflected on trainable transceivers associated with the account. For example, changes to a device may be automatically pushed to a trainable transceiver via one or more communication techniques discussed herein such that the trainable transceiver is updated in light of the user changes. Devices may be associated with individual users and/or trainable transceivers. A user may provide additional information related to a device via the cloud computing system client. For example, a user may provide location information for a user's home and/or devices for which the trainable transceiver is trained to control.

In some embodiments, the account allows the cloud computing system to store information related to one or more trainable transceivers, mobile communications devices, and/or other devices. For example, the cloud computing system may store device identification information, communication information, location information, and/or other information related to one or more devices. The home electronics devices, remote devices, and/or other devices for which a trainable transceiver is trained to control may be managed and/or otherwise altered via a cloud computing system client. For example, a user may add a new device to a trainable transceiver. The trainable transceiver may receive information from the cloud computing system in response such that the trainable transceiver is configured to control the newly added device (e.g., activation signal parameters and device identification information for the newly added device may be pushed to the trainable transceiver). A plurality of trainable transceivers may be managed. For example, a user may associate a particular trainable transceiver with one of a plurality of users with access to the account. Information may be transferred between trainable transceivers in response to a user command entered through the cloud computing system client. For example, a user may select the mode, copy or transfer, for which information is recalled from one trainable transceiver by another, select what devices are copied, and/or otherwise control the transfer of information. Other settings, configurations, information and/or other parameters of the trainable transceiver may be manipulated entered, provided, and/or changed by a user through an account implemented by the cloud computing system.

In one embodiment, a trainable transceiver may request information from the cloud computing system and receive information from the cloud computing system using an account or ID. For example, a user may enter his or her account ID or username and a password into a trainable transceiver. In response, the trainable transceiver may access the cloud computing system and transmit the account ID or username information to the cloud computing system. The cloud computing system may use the account ID, user name, and/or password to access configuration information, activation signal parameters, and/or other information stored for the account or username. The cloud computing system may transmit this and/or other information to the trainable transceiver. The trainable transceiver may store the information from the cloud computing system locally. The trainable transceiver may use the information from the cloud computing system in order to configure itself to control the device(s) associated with the information received. Thus, the trainable transceiver will be able to control one or more home electronics devices, remote devices, and/or other devices (e.g., format activation signals based on activation signal parameters and/or other information associated with the devices) based on the information stored in the cloud computing system an associated with the user's account ID and/or username.

In some embodiments, a user may change, using a cloud computing system client, the assignment of input devices for controlling devices. A user may assign activation signal parameters and/or other information corresponding to a home electronics device, remote device, and/or other device to a particular input device. For example, a user could assign activation parameters corresponding to a garage door opener to a first button of a trainable transceiver such that pressing the first button causes the trainable transceiver to transmit an activation signal to the garage door opener. Activation signal parameters form controlling a gate system could be assigned to a second button of the trainable transceiver such that pushing the second button causes the trainable transceiver to transmit an activation signal to the gate system.

Advantageously, a cloud computing system client and a cloud computing system based account may allow a newly purchased trainable transceiver and/or other transceiver to be quickly trained for a user's devices. For example, a user who purchases a new vehicle including a trainable transceiver may configure the trainable transceiver, using an account ID and/or user name, to control the user's devices. This may be done without leaving the dealership (e.g., at the location where the vehicle is purchased). As an additional example, a user borrowing a vehicle (e.g., a rental car, a friend's car, etc.) can quickly train the trainable transceiver therein, using the account ID and/or username, to operate the user's devices. Using the account and/or cloud computing system client a user could unassociated the rental trainable transceiver with the account thereby erasing the trainable transceiver in the borrowed vehicle.

Additional Functions and Embodiments

Generally, the trainable transceiver may include or be a configurable button for controlling a device such as mobile communications device or other device in communication with the trainable transceiver using one or more of the techniques described herein or otherwise in communication with the trainable transceiver. An application running on the device (e.g., mobile communications device) may be used to configure the button of the trainable transceiver to cause the application, another application, or the device (e.g., mobile communications device) to take a certain action in response to a user input. For example, pressing the button may cause the trainable transceiver to transmit information and/or instructions which when received by the device cause the device to take a particular action. For example, pressing the button may cause the transmission of an instruction to a mobile communications device which causes the mobile communications device to place a telephone call, begin playback of an audio file, and/or take another action. Advantageously, this may allow for control of the device while the device is not readily accessible (e.g., a mobile communications device is in the pocket of a user). For example, the user may press the button on the trainable transceiver rather than removing the device from his or her pocket to provide an input to the device. In further embodiments, the cloud computing system (e.g., a cloud computing system client) may be used to configure the button(s) or other input devices of a trainable transceiver to cause supplemental actions (e.g., configure the trainable transceiver for controlling a device such as mobile communications device or other device in communication with the trainable transceiver).

Generally, the trainable transceiver may determine information about a home electronics device, remote device, original transmitter, and/or other device without being trained to control the device. For example, the trainable transceiver may learn information such as activation signal parameters, training information, device identification information, status information, and/or other information from communication with the device yet not configure itself or be configured to send activation signals formatted to control the device. The trainable transceiver may transmit this information to one or more additional devices. For example, the information may be transmitted to the cloud computing system. In other embodiments, the information is transmitted to a mobile communications device. The mobile communications device may be configured to display the information or part of the information to a user (e.g., via an application and display). For example, a trainable transceiver may receive an activation signal sent by an original transmitter. The trainable transceiver may determine information such as activation signal parameters based on the signal from the original transmitter. Rather than or in addition to using this information for formatting activation signals, the trainable transceiver may transmit the activation signal parameters to a mobile communications device which may in turn display the activation signal parameters to a user. Other information may be determined, transmitted, and/or displayed.

Generally, the trainable transceiver store configuration information used to automatically configure the trainable transceiver in response to a communication from another device. In one embodiment, profile information and/or a profile containing other information (e.g., activation signal parameters, button or input device assignments for the activation signal parameters, etc.) may be stored on or tied to a key fob or vehicle key. The key fob or vehicle key may transmit the information and/or an identifier to the trainable transceiver. In one embodiment, the key fob or vehicle key transmits activation signal parameters for one or more devices along with operator input device assignments for the activation signal parameters. For example, the key rob or vehicle key transmits information which the trainable transceiver receives and uses to format activation signals for particular devices based on user input from a button corresponding to the device as determined based on the information. The key fob or vehicle key may transmit this information automatically when the key fob or key is within transmission range of the trainable transceiver. In other embodiments, the key fob or vehicle key transmits this information in response to a request transmission from the trainable transceiver. The request transmission may be sent by the trainable transceiver periodically, continuously, in response to the powering on, in response to a vehicle being started, in response to a user input corresponding to sending an activation signal (e.g., pushing a button), and/or otherwise be sent based on a schedule or triggering event.

In one embodiment, the key fob, vehicle key, mobile communications device, and/or other device transmits identification information only. The trainable transceiver may receive this identification information from the key fob or vehicle key. In some embodiments, the trainable transceiver receives the identification information indirectly such as through a vehicle electronics system in communication with the key fob or vehicle key. The trainable transceiver may store activation signal parameters, button assignments, and/or information such that the information is tied to a particular key fob or vehicle key. When the trainable transceiver receives identification information from the key fob or vehicle key, the trainable transceiver may configure itself to send activation signal parameters based on the activation signal parameters and/or button assignments stored with respect to that identification information. For example, the trainable transceiver may receive first identification information identifying a first key rob. In response, the trainable transceiver may configure itself to send activation signals based on a first set of activation signal parameters and/or button assignments. The trainable transceiver may then receive a second identification information identifying a second key fob. In response, the trainable transceiver may configure itself to send activation signals based on a second set of activation signal parameters and/or button assignments.

The above techniques may allow the trainable transceiver to automatically configure itself based on the identification information to correspond to multiple user's preferences and/or configurations. For example, a first user may have three button configured to open a first garage door opener, open a second garage door opener, and turn on lights respectively. When the first user operates a vehicle, the trainable transceiver associated with the vehicle may automatically configure itself to perform these functions with these buttons in response to the identification information, activations signal parameters, button assignment information, and/or other information received from a first key fob. When a second user operates the vehicle, the trainable transceiver may be configured in a different configuration in response to identification information, activations signal parameters, button assignment information, and/or other information received from a second key fob. For example, the buttons may be configured to open the second garage door opener, turn on the lights, and turn on a stereo respectively.

In some embodiments, a user may be required to bump the two mobile communications devices such that an accelerometer in one or more of the mobile communications devices may register a bump and allow for transfer of the information. Advantageously, this input to the accelerometer may be used as a security feature which requires the two mobile communications devices to be bumped together prior to the transfer of the information. This may ensure that the transfer is intended based on the two devices being in close proximity and a near simultaneous acceleration experienced by both devices. Other communication techniques and/or security actions may be used in order to transfer information form a first mobile communications device to a second communications device. In further embodiments, the same or similar techniques may be used in order to transfer information from a trainable transceiver and/or remote user interface module of a trainable transceiver to a mobile communications device.

In further embodiments, a mobile communications device may be used to train a trainable transceiver without a user providing an input on the trainable transceiver. For example, a user may input information into an application of a mobile communications device having been paired to the trainable transceiver and/or otherwise in communication with the trainable transceiver. The mobile communications device may use one or more of the techniques described herein to retrieve information such as activation signal parameters, training information, and/or other information related to a home electronics device, remote device, and/or other device. The mobile communications device may transmit this information to the trainable transceiver using one or more techniques described herein. Using the information received and/or in response to an instruction received, the trainable transceiver may configure itself or otherwise be configured to control a device using an activation signal (e.g., the trainable transceiver is trained based on the information received from the mobile communications device). Thus, the trainable transceiver may be trained without first receiving a user input on the trainable transceiver. In some embodiments, this function may be facilitated by one or more additional features or functions. For example, the communication from the mobile communications device may have an instruction, header, or other information which causes the trainable transceiver to enter a training mode prior to processing the information received from the mobile communications device. In some embodiments, the trainable transceiver may send a communication to the mobile communications device after being trained to confirm that the training occurred. The communication may be used to or cause the mobile communications device to display a confirmation message to a user that the trainable transceiver has been trained.

In some embodiments, the trainable transceiver may acquire activation signal parameters, training information, and/or other information related to a home electronics device, remote device, or other device from an original transmitter remote from the device associated with the original transmitter. For example, the original transmitter may be activated to transmit a signal which may be received by the trainable transceiver and from the signal information may be determined. This may use QuickTrain technology. In some embodiments, the trainable transceiver may use information determined from an original transmitter to train the trainable transceiver to operate a device. The trainable transceiver may retransmit a message from an original transmitter which was received remote from the device associated with the original transmitter. The trainable transceiver may pause. The trainable transceiver may then send an additional message (e.g., a QuickTrain message) to complete the training process. The device receiving the additional message (e.g., QuickTrain message) may complete the training process by using information received in the retransmitted message and/or additional message. For example, the additional message may place the device in learning mode and cause the device to store information received in the retransmitted message and/or additional message.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a device, comprising:

a trainable transceiver operable in a vehicle;

communications electronics configured to receive, via a cloud computing system, configuration information related to controlling a remote device separate from the vehicle; and a processing circuit coupled to the trainable transceiver and the communications electronics, the processing circuit configured to train the trainable transceiver to control the remote device using the configuration information received via the cloud computing system.

2. The system of claim 1, wherein the communications electronics include at least one of a cellular transceiver, a radio frequency transceiver, or a Bluetooth transceiver.

3. The system of claim 1, wherein processing circuit is configured to communicate with a mobile communications device using the communications electronics, and wherein the processing circuit is configured to communicate with the cloud computing system using the mobile communications device.

4. The system of claim 1, wherein the processing circuit is configured to transmit location information to the cloud computing system, wherein the cloud computing system is configured to determine whether the trainable transceiver is located within a geographic boundary based on a location of the remote device, and wherein the cloud computing system is configured to send the configuration information for training a trainable transceiver to the processing circuit only if the trainable transceiver is located within the geographic boundary based on the location of the remote device.

5. The system of claim 1, wherein the configuration information received via the cloud computing system is transmitted to the cloud computing system by a second trainable transceiver prior to being received by the processing circuit.

6. The system of claim 5, wherein the processing circuit is configured to operate according to a copy mode wherein upon receipt of the configuration information, the processing circuit is configured to transmit a signal to the cloud computing system which causes the cloud computing system to transmit a second signal to the second trainable transceiver formatted to erase at least a portion of the memory of the second trainable transceiver.

7. The system of claim 5, wherein the configuration information includes at least one of an activation signal parameter or an encryption key.

8. The system of claim 5, wherein the configuration information includes all data for controlling one or more devices stored on the second trainable transceiver.

9. The system of claim 5, wherein the processing circuit is configured to send a transmission which erases memory of the second trainable transceiver.

10. The system of claim 5, wherein the cloud computing system is configured to send a transmission which erases memory of the second trainable transceiver.

11. The system of claim 5, wherein the configuration information does not include an encryption key.

12. The system of claim 11, wherein the processing circuit is configured to cause the trainable transceiver to be learned by the device.

13. A method for training a trainable transceiver, comprising:

receiving, at a processing circuit operable in a vehicle, a user input;

sending a request transmission to a cloud computing system using communications electronics coupled to the processing circuit;

receiving configuration information, using the communication electronics, from the cloud computing system, wherein the configuration information is related to controlling a remote device separate from the vehicle and includes an activation signal parameter; and storing the configuration information received from the cloud computing system in memory coupled to the processing circuit.

14. The method of claim 13, wherein the configuration information includes a key.

15. The method of claim 13, wherein the configuration information does not include a key.

16. The method of claim 13, further comprising sending, using the communications electronics, an erase transmission to the cloud computing system.

17. The method of claim 16, wherein the cloud computing system sends a second erase transmission to a second trainable transceiver in response to receiving the erase transmission.

18. A system for controlling a remote device, comprising:

a trainable transceiver operable in a vehicle;

an input device;

communications electronics; and a processing circuit coupled to the trainable transceiver, the input device, and the communications electronics, the processing circuit configured to receive a user identification via the input device, wherein the processing circuit is configured to send, using the communications electronics, a transmission to a cloud computing system containing the user identification, and wherein the processing circuit is configured to train the trainable transceiver to control a remote device separate from the vehicle using configuration information received from a cloud computing system via the communications electronics, wherein the configuration information is related to controlling the remote device.

19. The system according to claim 18, wherein the cloud computing system is configured to transmit the configuration information to the processing circuit in response to receiving the user identification from the processing circuit.

20. The system according to claim 19, wherein the configuration information transmitted to the processing circuit is based on the user identification.

* * * * *